United States Patent
Yang

(10) Patent No.: US 12,436,541 B2
(45) Date of Patent: Oct. 7, 2025

(54) UNMANNED AUTONOMOUS VEHICLE AND INFORMATION PROCESSING METHOD TO CALCULATE WIND INFORMATION ACTING ON THE UNMANNED AUTONOMOUS VEHICLE

(71) Applicant: SONY GROUP CORPORATION, Tokyo (JP)

(72) Inventor: Seungha Yang, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 117 days.

(21) Appl. No.: 18/261,407

(22) PCT Filed: Jan. 14, 2022

(86) PCT No.: PCT/JP2022/001125
§ 371 (c)(1),
(2) Date: Jul. 13, 2023

(87) PCT Pub. No.: WO2022/158387
PCT Pub. Date: Jul. 28, 2022

(65) Prior Publication Data
US 2024/0069576 A1    Feb. 29, 2024

(30) Foreign Application Priority Data
Jan. 21, 2021    (JP) ................. 2021-008262

(51) Int. Cl.
*G05D 1/10*    (2006.01)
*G05D 1/00*    (2006.01)
(Continued)

(52) U.S. Cl.
CPC ......... *G05D 1/1062* (2019.05); *G05D 1/0816* (2013.01); *B64U 10/14* (2023.01); *B64U 2101/30* (2023.01)

(58) Field of Classification Search
CPC .. G05D 1/1062; G05D 1/0816; G05D 1/2437; G05D 1/245; G05D 2109/254;
(Continued)

(56) References Cited

U.S. PATENT DOCUMENTS 11,459,117 B1 *    10/2022    Shapiro ................. G08G 5/55

FOREIGN PATENT DOCUMENTS

JP    05-215761 A    8/1993
JP    2017-173238 A    9/2017
(Continued)

OTHER PUBLICATIONS

International Search Report and Written Opinion of PCT Application No. PCT/JP2022/001125, issued on Feb. 15, 2022, 09 pages of ISRWO.

*Primary Examiner* — Brian P Sweeney
(74) *Attorney, Agent, or Firm* — CHIP LAW GROUP

(57) ABSTRACT

There is provided a mobile body that includes an imaging unit to capture an image of an environment around the mobile body, an estimation unit to estimate a position of the mobile body on the basis of the image captured by the imaging unit, a calculation unit to calculate the position of the mobile body on the basis of a control command for controlling movement of the mobile body, and a wind information calculation unit to calculate information regarding wind acting on the mobile body on the basis of a first position that is the position of the mobile body, which is estimated by the estimation unit, and a second position that is the position of the mobile body, which is calculated by the calculation unit.

12 Claims, 18 Drawing Sheets

(51) Int. Cl.
    *G05D 1/08*      (2006.01)
    *B64U 10/14*     (2023.01)
    *B64U 101/30*    (2023.01)

(58) Field of Classification Search
    CPC ............ G05D 2111/54; G05D 2111/65; G05D
                    1/606; G05D 1/695; B64U 10/14; B64U
                    2101/30; B64U 10/13; B64D 45/00;
                                                    G01P 3/36
    See application file for complete search history.

(56)                References Cited

FOREIGN PATENT DOCUMENTS

| JP | 2017-174159 A  | 9/2017 |
| JP | 2020-112557 A  | 7/2020 |
| WO | 2020/189493 A1 | 9/2020 |

* cited by examiner

FIG. 11
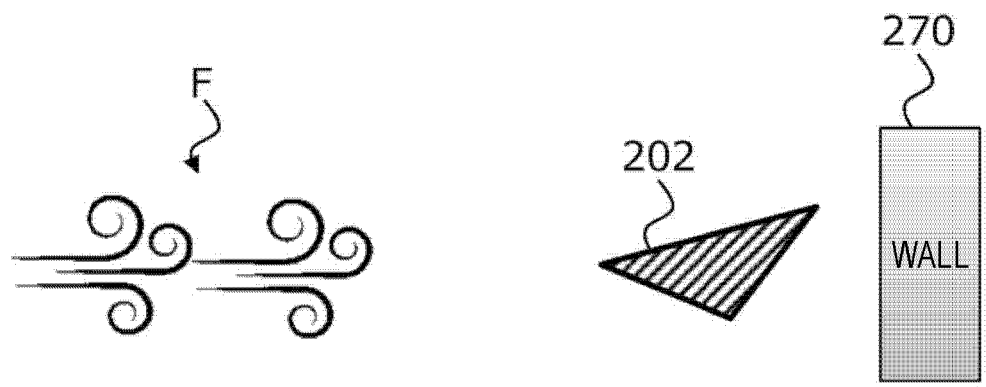
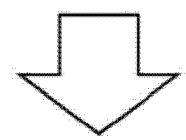
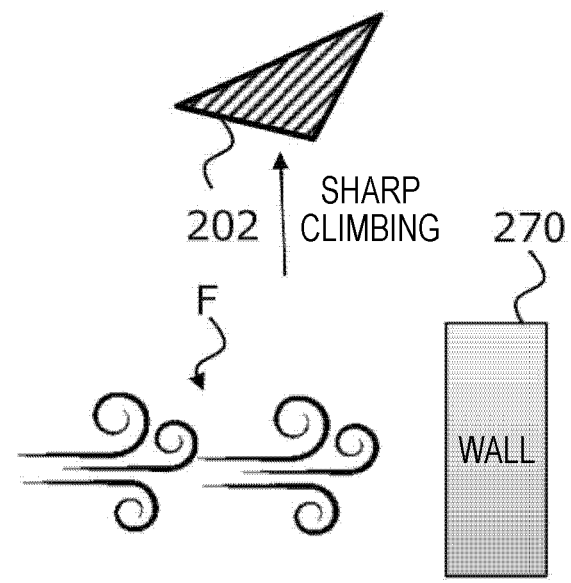

UNMANNED AUTONOMOUS VEHICLE AND INFORMATION PROCESSING METHOD TO CALCULATE WIND INFORMATION ACTING ON THE UNMANNED AUTONOMOUS VEHICLE

CROSS REFERENCE TO RELATED APPLICATIONS

This application is a U.S. National Phase of International Patent Application No. PCT/JP2022/001125 filed on Jan. 14, 2022, which claims priority benefit of Japanese Patent Application No. JP 2021-008262 filed in the Japan Patent Office on Jan. 21, 2021. Each of the above-referenced applications is hereby incorporated herein by reference in its entirety.

TECHNICAL FIELD

The present disclosure relates to a mobile body, an information processing method, and a computer program.

BACKGROUND ART

A drone is used in various applications such as aerial photographing, measurement, disaster rescue, physical distribution transport, and entertainment performance. The drone in flight is susceptible to wind. The wind causes the attitude of the drone to fluctuate or the position of the drone to deviate. There is a need to stably fly the drone even in a situation where the wind is blowing.

Patent Document 1 below discloses a device that determines a state of wind blowing in a periphery direction and in a traveling direction. In this device, an image of a linear object suspended between a plurality of structures needs to be present in a captured scenery image. Furthermore, a wind direction can be detected only in a normal vector direction of the plane formed by a plurality of the structures and the linear object. Therefore, in an environment where there is no linear object suspended between a plurality of the structures, or in a case where wind is blowing in a direction other than the direction that can be sensed, a wind state cannot be determined, and the drone cannot stably fly.

CITATION LIST

Patent Document

Patent Document 1: Japanese Patent Application Laid-Open No. 2017-173238

SUMMARY OF THE INVENTION

Problems to be Solved by the Invention

The present disclosure provides a mobile body, an information processing method, and a computer program, in which the mobile body can be stably moved.

Solutions to Problems

A mobile body of the present disclosure includes: an imaging unit configured to capture an image of an environment around the mobile body; an estimation unit configured to estimate a position of the mobile body on the basis of the image captured by the imaging unit; a calculation unit configured to calculate the position of the mobile body on the basis of a control command for controlling movement of the mobile body; and a wind information calculation unit configured to calculate information regarding wind acting on the mobile body on the basis of a first position that is the position of the mobile body, which is estimated by the estimation unit, and a second position that is the position of the mobile body, which is calculated by the calculation unit.

An information processing method of the present disclosure includes: capturing an image of an environment around a mobile body; estimating a position of the mobile body on the basis of the captured image; calculating the position of the mobile body on the basis of a control command for controlling movement of the mobile body; and calculating information regarding wind acting on the mobile body on the basis of a first position that is the estimated position of the mobile body and a second position that is the calculated position of the mobile body.

A computer program of the present disclosure causes a computer to execute: a step of estimating a position of a mobile body on the basis of an image obtained by imaging an environment around the mobile body; a step of calculating the position of the mobile body on the basis of a control command for controlling movement of the mobile body; and a step of calculating information regarding wind acting on the mobile body on the basis of a first position that is the estimated position of the mobile body and a second position that is the calculated position of the mobile body.

BRIEF DESCRIPTION OF DRAWINGS

FIG. 11 is a diagram illustrating a specific example of avoiding an obstacle.

MODE FOR CARRYING OUT THE INVENTION

Hereinafter, an embodiment of the present disclosure is described in detail with reference to the drawings. In one or more embodiments described in the present disclosure, elements included in each of the embodiments can be combined with each other, and the combined result also forms a part of the embodiments described in the present disclosure.

Figure 1:
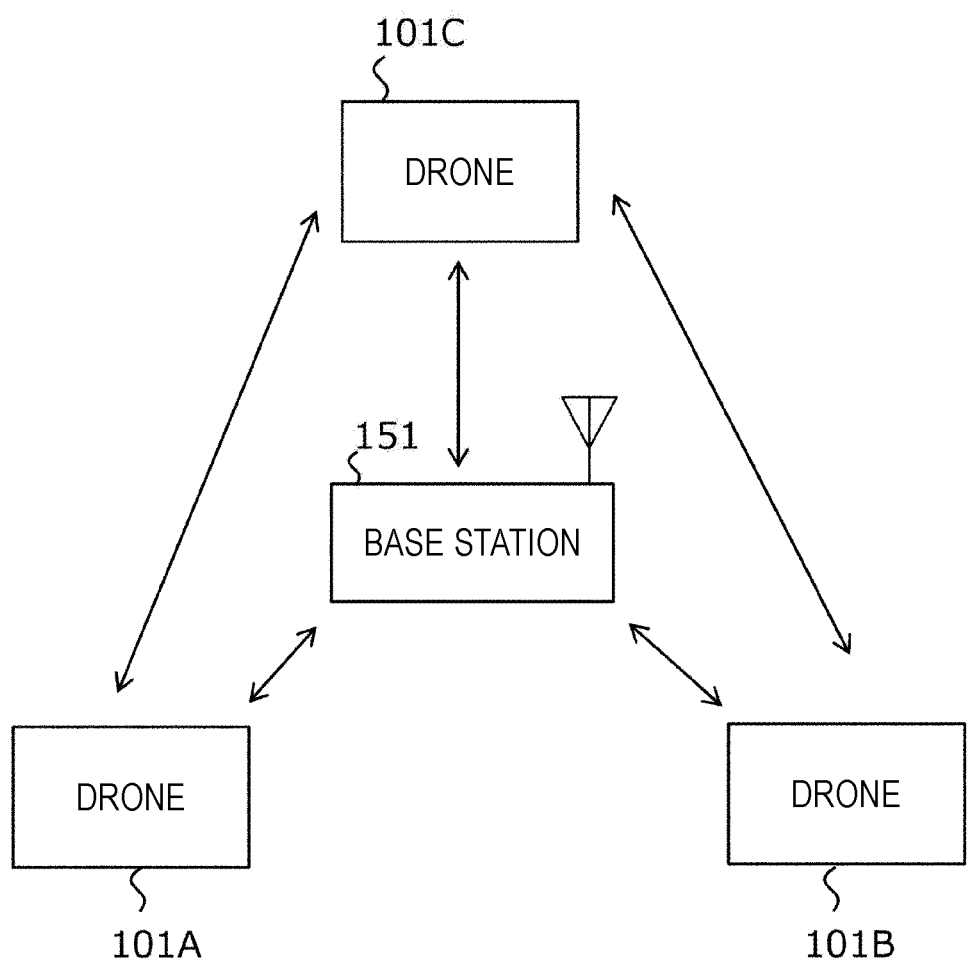
FIG. 1 is a block diagram of an example of a communication system according to an embodiment of the present disclosure.

FIG. 1 is a block diagram of an example of a communication system according to the embodiment of the present disclosure. The communication system of FIG. 1 includes a plurality of mobile bodies 101A, 101B, and 101C and a base station 151. The mobile body of the embodiment is a drone (unmanned aerial vehicle), and the mobile bodies 101A to 101C are referred to as drones 101A to 101C. The drone is an example of a mobile body, and the mobile body may be any apparatus that can move autonomously or manually, such as a robot unmanned carrier or an automatic driving vehicle. Although three drones are illustrated in the drawing, the number of drones may be one, two, or four or more. Each of the drone 101A, the drone 101B, and the drone 101C can perform bidirectional wireless communication with the base station 151. Furthermore, the drones 101A to 101C can communicate with each other. The drones 101A to 101C can mutually confirm their positions via the base station 151 or by direct communication. One arbitrary drone is referred to as a drone 101.

The drone 101 is a mobile body that can fly by driving a plurality of rotors. The drone 101 flies under the control of the base station 151. The route of the drone 101 may be designated by the base station 151 and the drone 101 may fly along the designated route. The base station 151 may designate a starting place and a destination of the drone 101 and the drone 101 may generate the route from a starting place to a destination by itself (autonomous flight).

Figure 2:
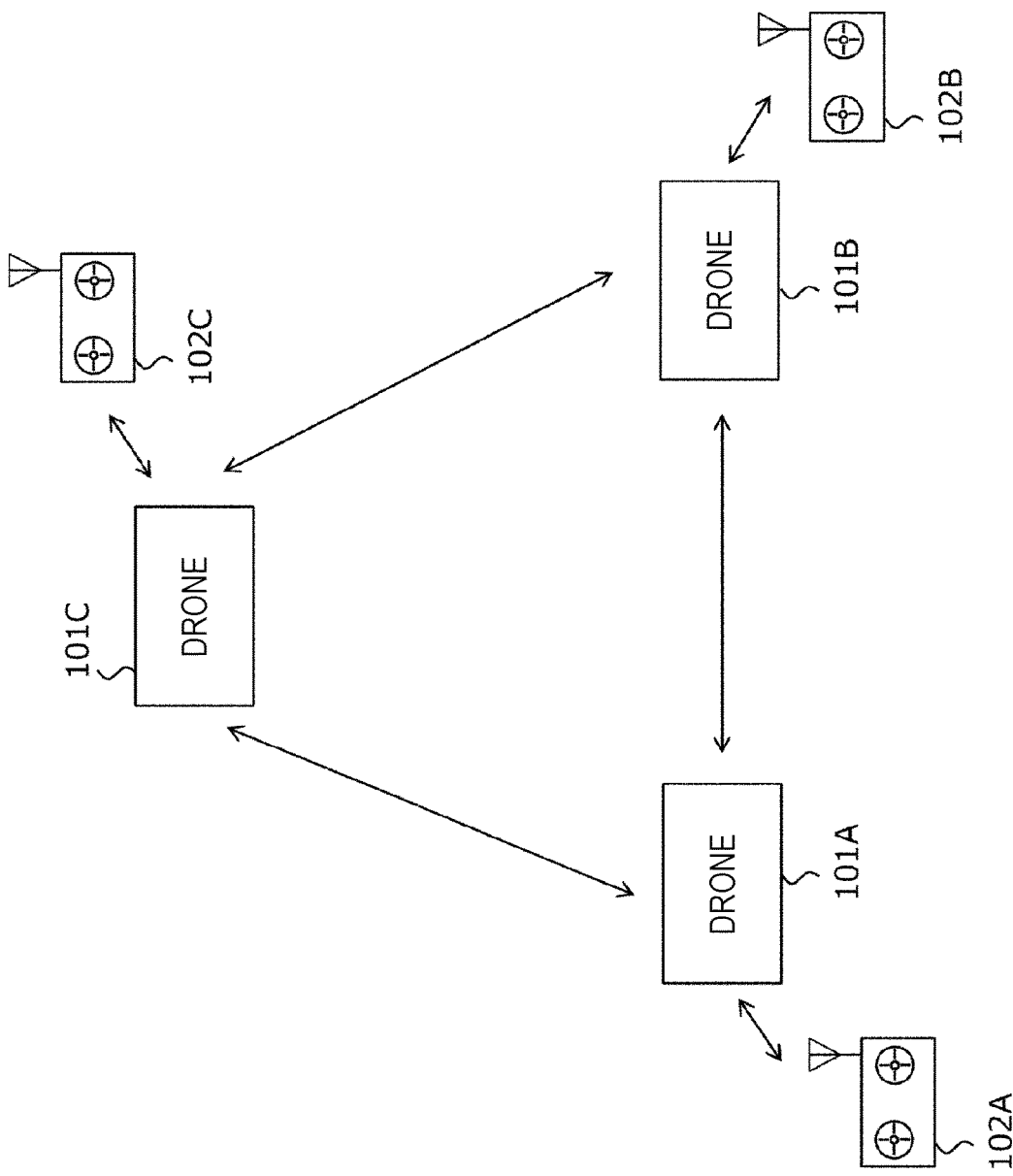
FIG. 2 is a block diagram of another example of a communication system according to the embodiment of the present disclosure.

FIG. 2 is a block diagram of another example of the communication system according to the embodiment of the present disclosure. The components having the same names as those in FIG. 1 are denoted by the same reference numerals, and a detailed description thereof will be omitted. In the example of FIG. 2, the drones 101A to 101C are operated by remote controllers 102A to 102C of users. One arbitrary remote controller is referred to as a remote controller 102. The drones 101A to 101C fly in accordance with control commands input from the users via the remote controllers 102A to 102C (manual flight). The drones 101A to 101C can communicate with each other and can confirm mutual positions.

Some of the drones 101A to 101C may be operated by the remote controller, and the remaining may be controlled by the base station 151.

Figure 3A:
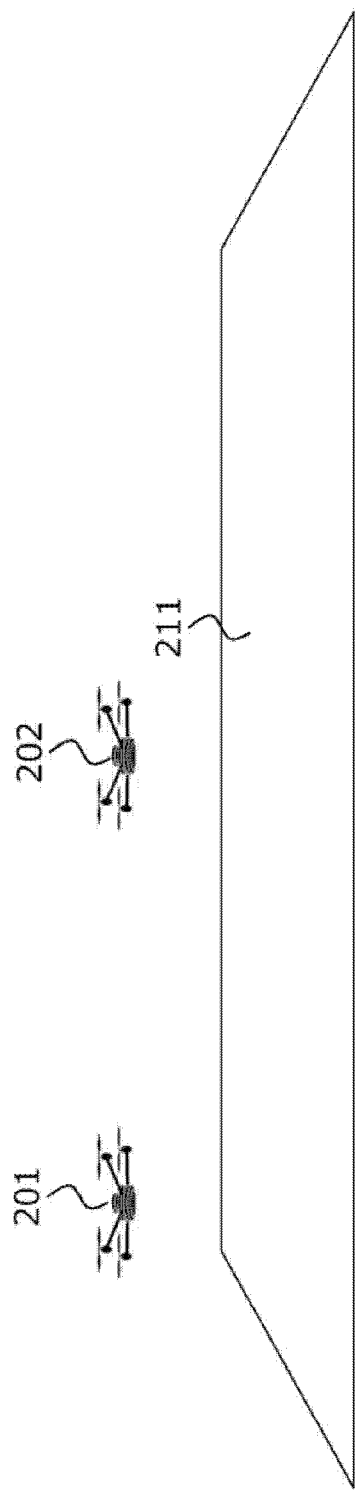
FIGS. 3A, 3B, and 3C are diagrams for explaining an outline of the embodiment.
Figure 3B:
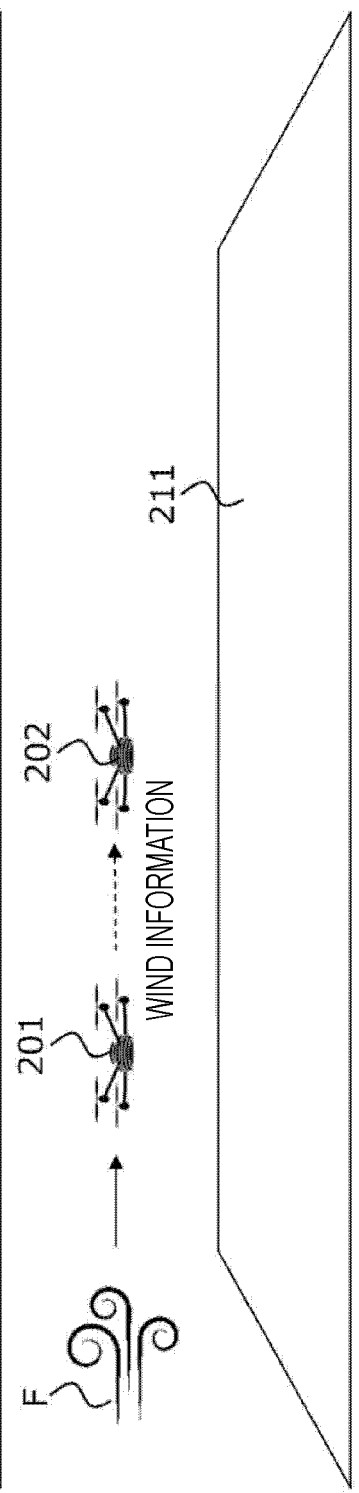
Figure 3C:
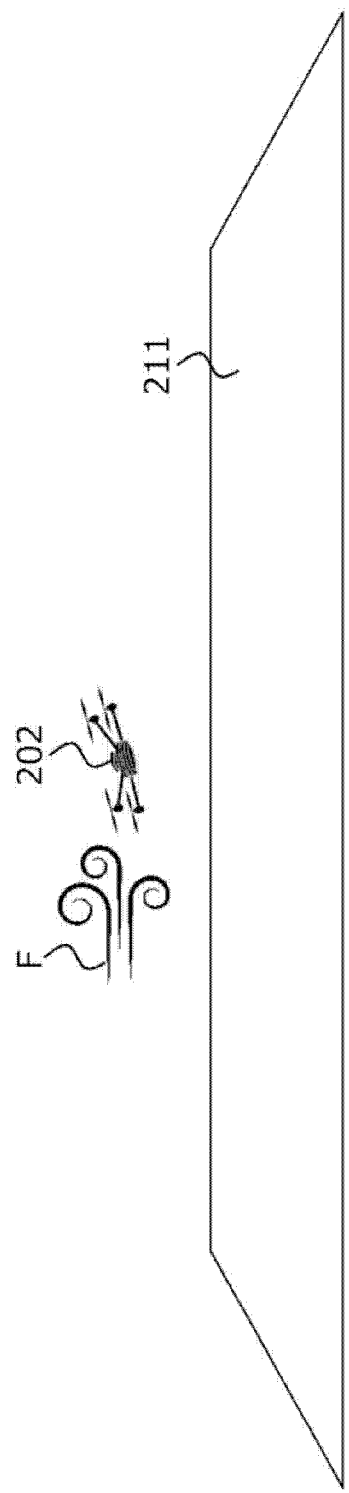

FIGS. 3A, 3B, and 3C are diagrams for explaining an outline of the embodiment. One of the drones 101A to 101C is set as a wind-sensing drone 201, and another one is set as a target drone 202.

In FIG. 3A, the wind-sensing drone 201 and the target drone 202 are flying above a ground surface 211, and are performing a work designated in advance (for example, aerial photographing). The wind-sensing drone 201 and the target drone 202 may not be moving (hovering) or may be moving.

As illustrated in FIG. 3B, wind F blows to the wind-sensing drone 201 from the left. The wind-sensing drone 201 estimates a position (first position) of the wind-sensing drone 201 itself on the basis of an image or the like obtained by an imaging device mounted on the wind-sensing drone 201. Furthermore, the wind-sensing drone 201 calculates a position (second position) of the wind-sensing drone 201 itself on the basis of a movement control command input to the wind-sensing drone 201 from the base station or the remote controller. The wind-sensing drone 201 acquires information regarding the wind F (for example, a wind speed, a wind direction, and the like) on the basis of the first position and the second position.

The wind-sensing drone 201 transmits the information regarding the wind F to the target drone 202 present on the downstream side of the wind direction. The target drone 202 receives the wind information from the wind-sensing drone 201 before the wind arrives.

As illustrated in FIG. 3C, the target drone 202 performs control to suppress or prevent the position of the target drone 202 itself from fluctuating due to the wind coming toward the target drone 202 on the basis of the received wind information. For example, the output of a plurality of rotors is controlled to control the acceleration or the like of the target drone 202. Therefore, the position of the target drone 202 is prevented fluctuating due to the wind, or the position fluctuation can be reduced, and the work that has performed until the wind arrives at the target drone 202 can be stably continued at the same place. Note that in FIG. 3C, the wind-sensing drone 201 is not illustrated.

As described above, the target drone 202 can suppress or prevent the target drone 202 itself from being moved due to the influence of the wind by acquiring the wind information in advance from the wind-sensing drone 201 present on the upstream side of the wind direction with respect to the target drone 202.

Figure 4:
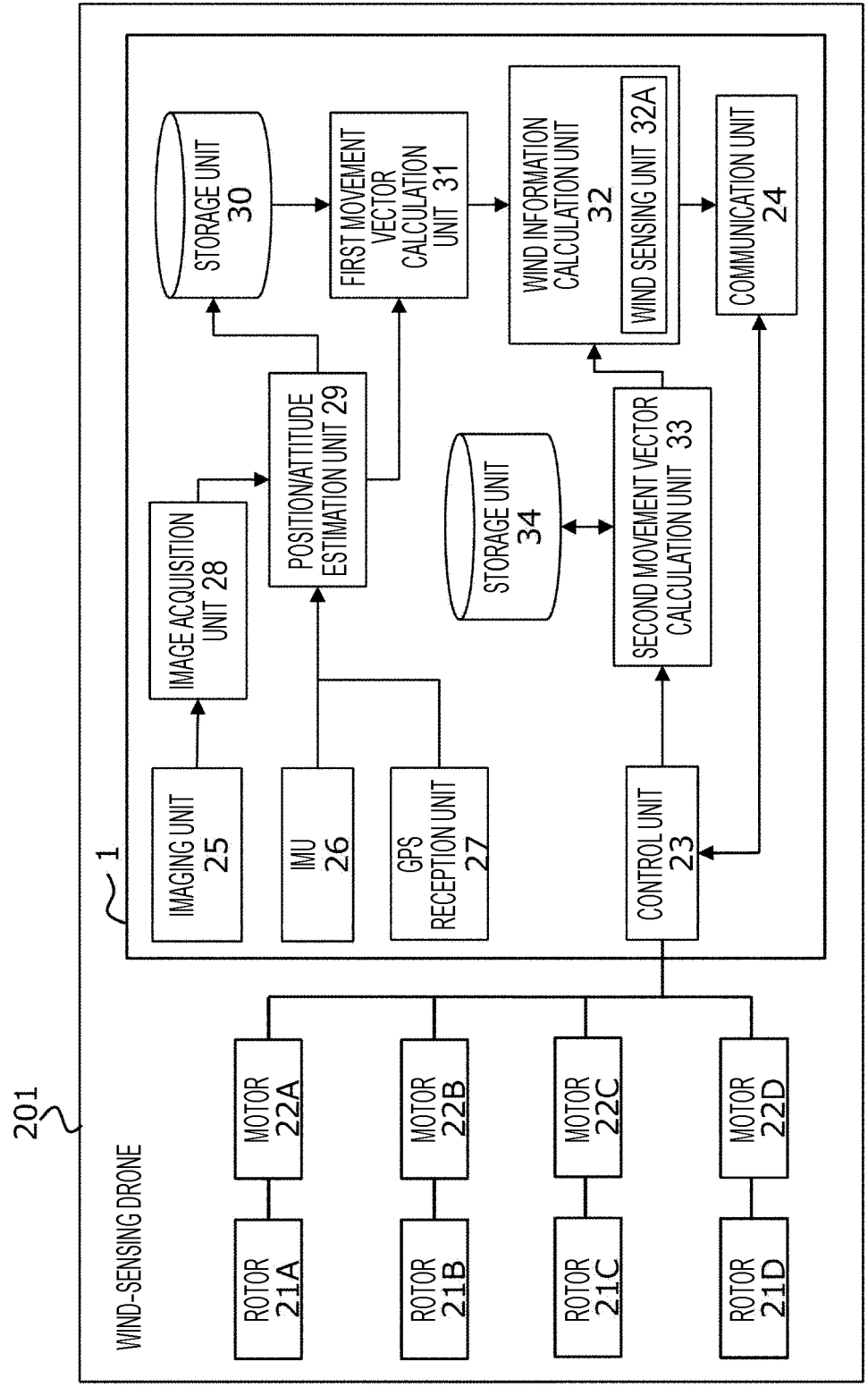
FIG. 4 is a block diagram of an example of a wind-sensing drone.

FIG. 4 is a block diagram of an example of the wind-sensing drone 201. The wind-sensing drone 201 includes a plurality of rotors 21A to 21D, a plurality of motors 22A to 22D, and an information processing apparatus 1. The information processing apparatus 1 includes a control unit 23, a communication unit 24, an imaging unit 25, an inertial measurement unit (IMU) 26, a GPS reception unit 27, an image acquisition unit 28, a position/attitude estimation unit 29 (estimation unit), a storage unit 30, a first movement vector calculation unit 31, a wind information calculation unit 32, a second movement vector calculation unit 33 (calculation unit), and a storage unit 34. The wind information calculation unit 32 includes a wind sensing unit 32A.

The imaging unit 25 is an imaging device that senses an imaging range in a space where the wind-sensing drone 201 flies and acquires an image including pixel values of a plurality of pixels. The imaging unit 25 includes, for example, a luminance camera such as an RGB camera or an infrared camera. An imaging element is, for example, a charge coupled device (CCD) image sensor, a complementary metal oxide semiconductor (CMOS) image sensor, or the like. In addition to or instead of the luminance camera, the imaging unit 25 may include a depth camera (distance camera) such as a stereo camera, a radar, a time of flight (TOF) camera, or light detection and ranging (LiDAR). The number of the imaging units 25 and an installation position thereof may be arbitrary. As an example, one or more imaging units 25 are installed at positions where the surroundings and the lower side (ground surface side) of the wind-sensing drone 201 can be imaged. A position and orientation of the imaging unit 25 may be fixed, or the position and orientation of the imaging unit 25 may be changed by the control unit 23. The imaging timing of the imaging unit 25 may be controlled by the control unit 23. For example, the imaging unit 25 may perform imaging at a constant rate or at an arbitrary timing.

The image acquisition unit 28 acquires an image (for example, an image including the ground surface) captured by the imaging unit 25. The image acquisition unit 28 provides the acquired image to the position/attitude estimation unit 29. The image acquisition unit 28 may add a time to the acquired image.

The IMU 26 detects inertial data including at least one of the acceleration of the wind-sensing drone 201 or the angular velocity of three axes. The IMU 26 provides the detected inertial data to the position/attitude estimation unit 29.

The GPS reception unit 27 receives a signal from a global positioning system (GPS) satellite, and detects the position of the drone 201 on the basis of the received signal. The GPS reception unit 27 provides positional information indicating the detected position to the position/attitude estimation unit 29 or the communication unit 24. The positional information may indicate latitude and longitude. Alternatively, the positional information is, for example, a three-axes coordinate system (XYZ coordinate system) with the position of the base station or the position of the remote controller, which is set as the origin or set to a predetermined position, such as (X, Y, Z)=(7.3 m, 4.1 m, 15.8 m).

The wind-sensing drone 201 may include sensors (not illustrated), for example, an azimuth sensor (gyro sensor, a GPS compass, an electronic compass, or the like), an ultrasonic sensor, and an atmospheric pressure sensor.

The rotors 21A to 21D rotate to generate a lifting force, and thus cause the wind-sensing drone 201 to fly. The rotors 21A to 21D are rotated by the motors 22A to 22D. The motors 22A to 22D rotate the rotors 21A to 21D. The rotation of the motors 22A to 22D is controlled by the control unit 23.

The control unit 23 controls the entire wind-sensing drone 201.

The control unit 23 adjusts the rotational speeds of the motors 22A to 22D to adjust the rotational speeds of the rotors 21A to 21D. By adjusting the rotational speeds of the rotors 21A to 21D, the control unit 23 can adjust the wind-sensing drone 201 to have an arbitrary attitude and apply an arbitrary acceleration to the wind-sensing drone 201. Therefore, the wind-sensing drone 201 can be moved in an arbitrary direction and at an arbitrary speed.

The control unit 23 controls sensing of the imaging unit 25 and the IMU 26.

The communication unit 24 receives a control command (instruction data) related to flight or work from the base station 151 or the remote controller 102. For example, the communication unit 24 receives the control command at constant sample time intervals. The communication unit 24 provides the received control command to the control unit 23. The control unit 23 controls the wind-sensing drone 201 to fly and work according to the control command. The contents of work may be arbitrary, for example, aerial photographing, measurement, disaster rescue, physical distribution transport, or performance.

The communication unit 24 transmits and receives information or data by performing wireless communication with the base station 151 or the remote controller 102. Furthermore, the communication unit 24 transmits and receives information or data by performing wireless communication with another drone (for example, the target drone 202). The communication unit 24 can confirm the mutual positions by communicating with another drone. For example, the communication unit 24 may transmit information regarding the position detected by the GPS reception unit 27 to another drone or the base station 151. Any method may be used as a method of the wireless communication. For example, the standard may be the IEEE 802.11 standard, the IEEE 802.15.1 standard, or other standards. The frequency band used for wireless communication is, for example, a 2.4 GHz band, a 5 GHz band, or other frequency bands.

The control unit 23 uses the communication unit 24 to control processing related to transmission and reception of information or data to and from the base station 151 or the remote controller 102. Furthermore, the control unit 23 uses the communication unit 24 to control processing related to transmission and reception of information or data to and from another drone (target drone 202 or the like).

The control unit 23 executes a control command received from the base station 151 or the remote controller 102 via the communication unit 24, and performs control to perform flight and work along the flight route.

The second movement vector calculation unit 33 calculates a movement vector (referred to as a movement vector B) including a movement distance (movement amount B) and movement direction of the wind-sensing drone 201 on the basis of a movement control command executed by the control unit 23. Examples of the control instruction include a movement direction and a movement speed. The control unit 23 can calculate the movement amount by the product of the movement speed and the movement time on which an instruction is given by the control command (for example, in a case where the control command is issued every sample time, one control command corresponds to one sample time). Alternatively, in a case where the movement amount is directly included in the control command, the control unit 23 may use the movement amount included in the control instruction. As the position before execution of the control command (position before movement), a position stored in the storage unit 30 to be described later is used (alternatively, the use of the position detected by the GPS reception unit 27 is not excluded). The second movement vector calculation unit 33 stores information regarding the calculated movement vector B (movement amount B and the movement direction) in the storage unit 34. Furthermore, the second movement vector calculation unit 33 provides information regarding the calculated movement vector B to the wind information calculation unit 32. The second movement vector calculation unit 33 includes a calculation unit that calculates the position of the wind-sensing drone 201 on the basis of the control command.

The position/attitude estimation unit 29 estimates the position and attitude of the wind-sensing drone 201 on the basis of at least one or both of the image of the surrounding environment provided from the image acquisition unit 28 and the inertial data from the IMU 26. The position/attitude estimation unit 29 may omit estimation of the attitude and estimate only the position. Information regarding the estimated attitude can be provided to the control unit 22 and used for attitude control. The estimated position is used to calculate wind information as will be described later. The position/attitude estimation unit 29 stores information regarding the estimated position and attitude in the storage unit 30. Furthermore, the position/attitude estimation unit 29 provides information regarding the estimated position and attitude to the first movement vector calculation unit 31. The position/attitude estimation unit 29 may store the image of the surrounding environment, the inertial data, and the GPS positional information in the storage unit 30 in association with time.

As a specific example in which the position/attitude estimation unit 29 estimates a position and an attitude, simultaneous localization and mapping (SLAM) can be used. The position/attitude estimation unit 29 can estimate the position and attitude at a target time (current time) by using the SLAM. The SLAM is a technique for simultaneously performing self-position estimation and environment map creation. In the case of using the SLAM, for example, the image around the wind-sensing drone 201 before movement is compared with the image around the wind-sensing drone 201 after the movement, and the same feature points are found in both the images and aligned. Then, the position and attitude after the movement are estimated by integrating the inertial data with reference to the position and attitude before the movement. As the position before the movement, the previously estimated position can be used. However, in a case where the operation is first performed or the operation is reset once, the position detected by the GPS reception unit 27 is used as an initial position. Furthermore, as the attitude before the movement, the previously estimated value can be used. The position and attitude before the movement are the position and attitude before the control unit 23 executes the control command. The time between before and after the movement corresponds to the movement time. In this way, by using the SLAM, the position and attitude after the movement can be estimated with high accuracy. In a case where the position after the movement is acquired using the GPS reception unit 27, it is difficult to detect the position with high accuracy due to an error of the GPS. However, the position after the movement can be calculated with high accuracy by using the SLAM.

The first movement vector calculation unit 31 calculates a movement vector A on the basis of the difference between a position at a target time (position after movement) and a position before the target time by the movement time (position before movement). The movement vector A includes a distance (movement amount A) by which the wind-sensing drone 201 moves and a movement direction. In order to calculate the movement vector A, the first movement vector calculation unit 31 acquires information regarding the position before the movement (for example, the previously estimated position) from the storage unit 30. The first movement vector calculation unit 31 provides information regarding the calculated movement vector A to the wind information calculation unit 32.

The wind information calculation unit 32 calculates information regarding wind (wind information) acting on the wind-sensing drone 201 on the basis of the movement vector A (movement amount A and the movement direction) estimated by the first movement vector calculation unit 31 and the movement vector B (movement amount B and the movement direction) calculated by the second movement vector calculation unit 33. More specifically, the wind information unit calculates a difference between the movement vectors A and B as a wind vector.

Figure 5:
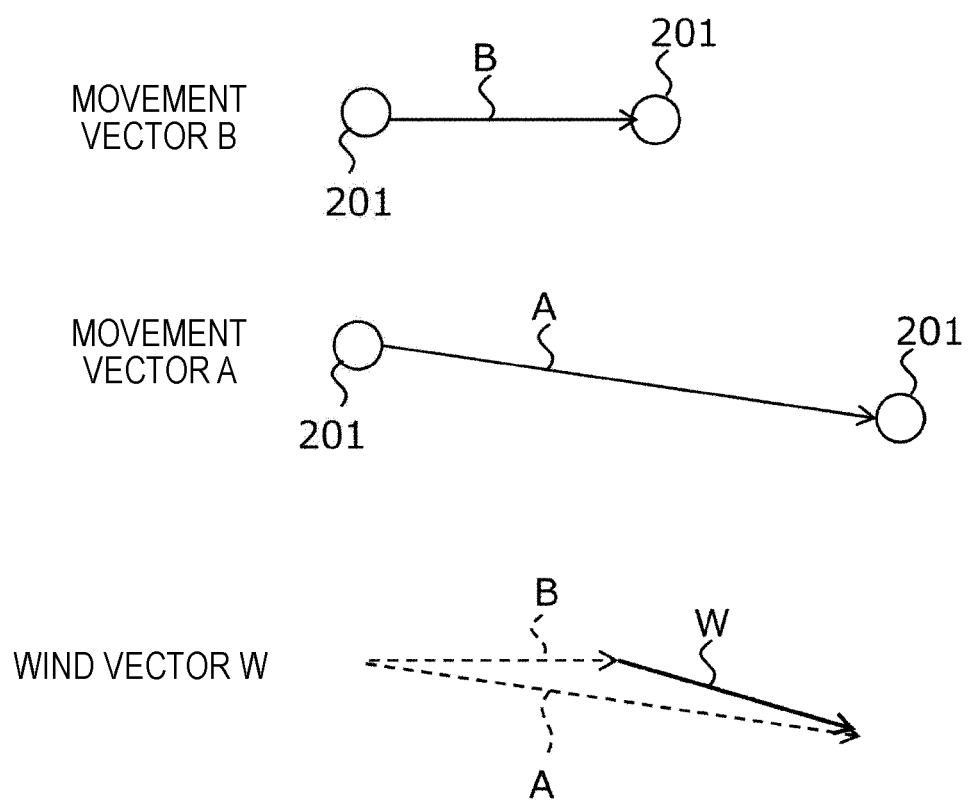
FIG. 5 is a diagram illustrating examples of a movement vector A, a movement vector B, and a wind vector.

FIG. 5 illustrates examples of the movement vector B calculated by the second movement vector calculation unit 33, the movement vector A calculated by the first movement vector calculation unit 31, and the wind vector (wind vector is indicated by W) calculated by the wind information calculation unit 32. The magnitude (length) of the wind vector W corresponds to a distance by which the wind-sensing drone 201 is moved by the wind. The direction of the wind vector W corresponds to the wind direction.

The wind sensing unit 32A of the wind information calculation unit 32 determines whether the magnitude of the wind vector W is larger than a threshold. In a case where the wind vector W is equal to or less than the threshold, it is determined that no wind is blowing or it is regarded that no wind is blowing. In a case where the magnitude of the wind vector W is larger than the threshold, the wind information calculation unit 32 calculates a speed of wind and a direction of wind on the basis of the wind vector W. As described above, the direction of wind is a direction of the wind vector W. Furthermore, the speed of wind is calculated by dividing the length of the wind vector W by the above-described movement time. The wind information calculation unit 32 provides wind information including the speed of wind and the direction of wind to the communication unit 24.

Although the wind information is calculated using the movement vectors A and B in the above description, the wind information may be calculated by another method as long as it is based on the position (second position) calculated by the second movement vector calculation unit 33 and the position (first position) estimated by the position/attitude estimation unit 29. For example, the speed of wind may be calculated by dividing a difference (distance) between the first position and the second position by the movement time of the wind-sensing drone 201. Furthermore, the direction from the first position to the second position is only required to be the direction of wind.

A specific example of calculating the movement amounts A and B of the wind-sensing drone 201 and the speed of wind will be described with reference to FIG. 6 to FIG. 8.

Figure 6:
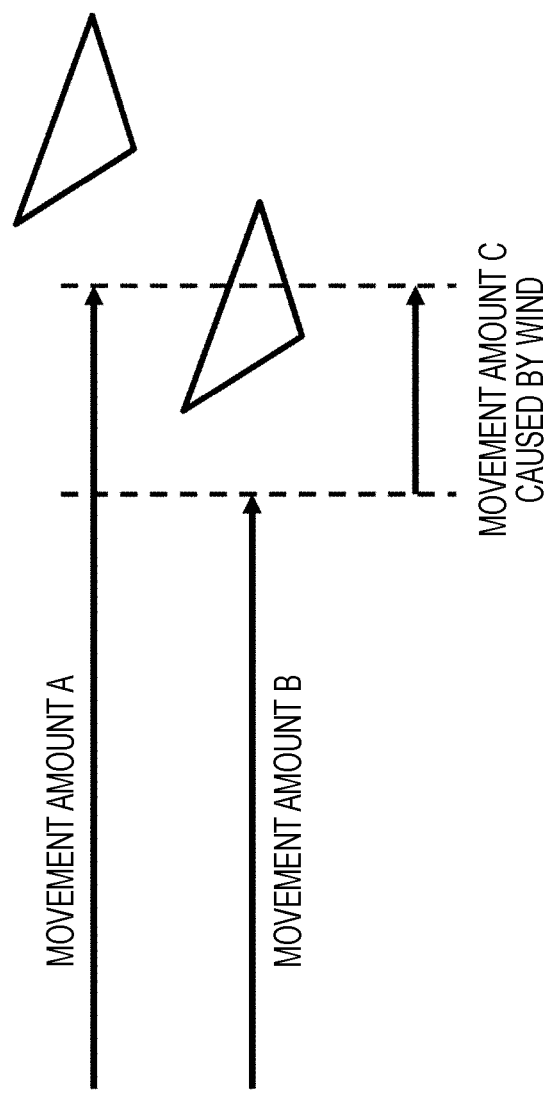
FIG. 6 is a diagram illustrating examples of a calculated movement amount A and a calculated movement amount B.

FIG. 6 illustrates, as an example, the movement amount A calculated by the first movement vector calculation unit 31 and the movement amount B calculated by the second movement vector calculation unit 33. The movement amount A corresponds to the length of the movement vector A, and the movement amount B corresponds to the length of the movement vector B. In this example, for the sake of simplicity, it is assumed that the direction in which the wind-sensing drone 201 is moved by the wind matches the direction on which an instruction is given by the control command, and there is no change in the movement direction due to the influence of the wind. A difference between the movement amount A and the movement amount B corresponds to a distance (referred to as a movement amount C caused by wind) by which the wind-sensing drone 201 is moved by the wind, that is, the length of the wind vector W. Therefore, in the example of FIG. 6, the speed of wind is calculated by Wind speed (m/s)=C/Movement time.

Note that in a case where there is no wind, the movement amount A and the movement amount B match or substantially match.

Figure 7:
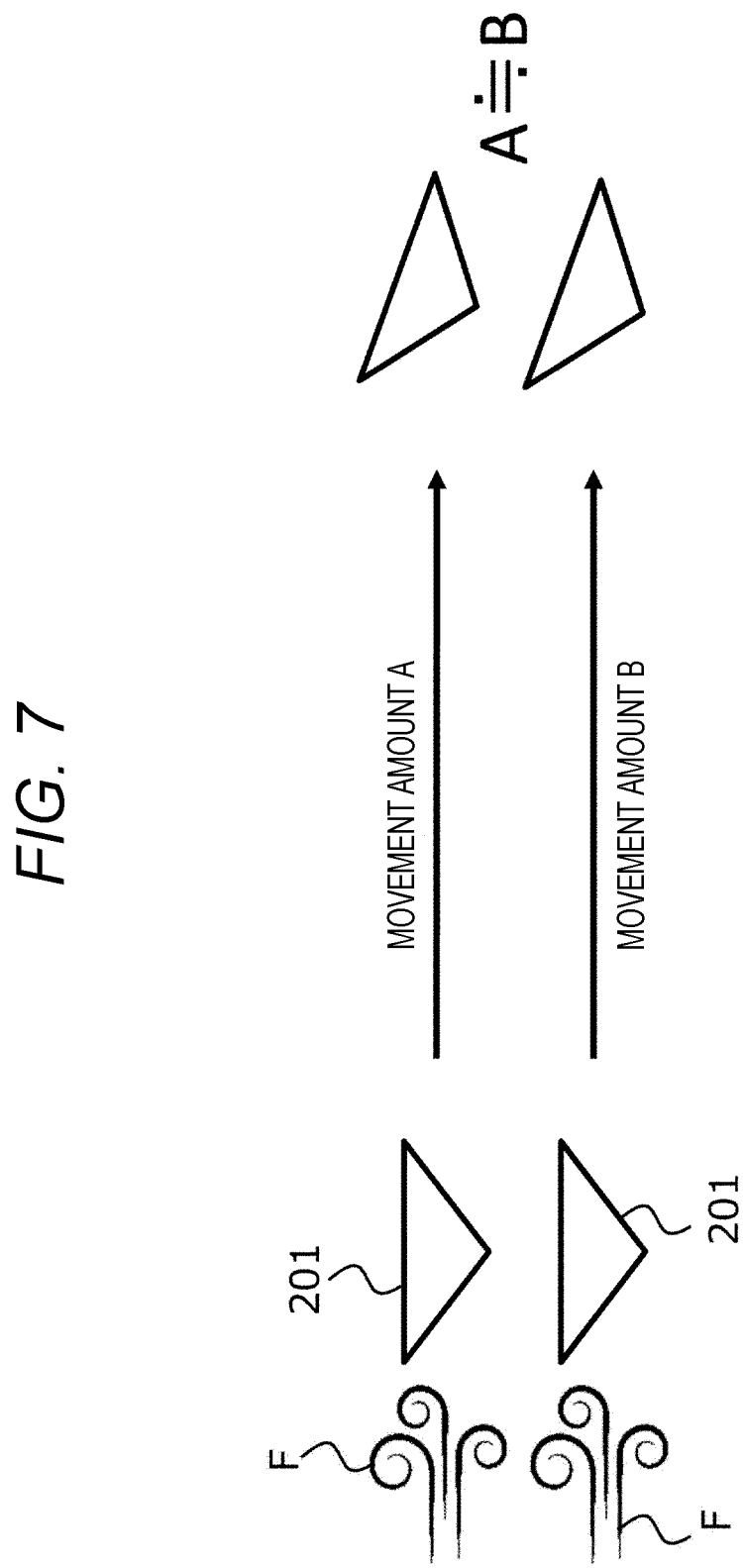
FIG. 7 is a diagram illustrating an example in which a movement amount A and a movement amount B match or substantially match in a case where there is no wind.

FIG. 7 illustrates an example in which the movement amount A and the movement amount B match or substantially match in a case where there is no wind.

In the example of FIG. 6 described above, the direction on which the instruction is given by the control command matches the direction of wind. However, there may be a case where the direction on which the instruction is given by the control command is opposite to the wind, that is, there may be a case where the wind-sensing drone 201 moves against the wind.

Figure 8:
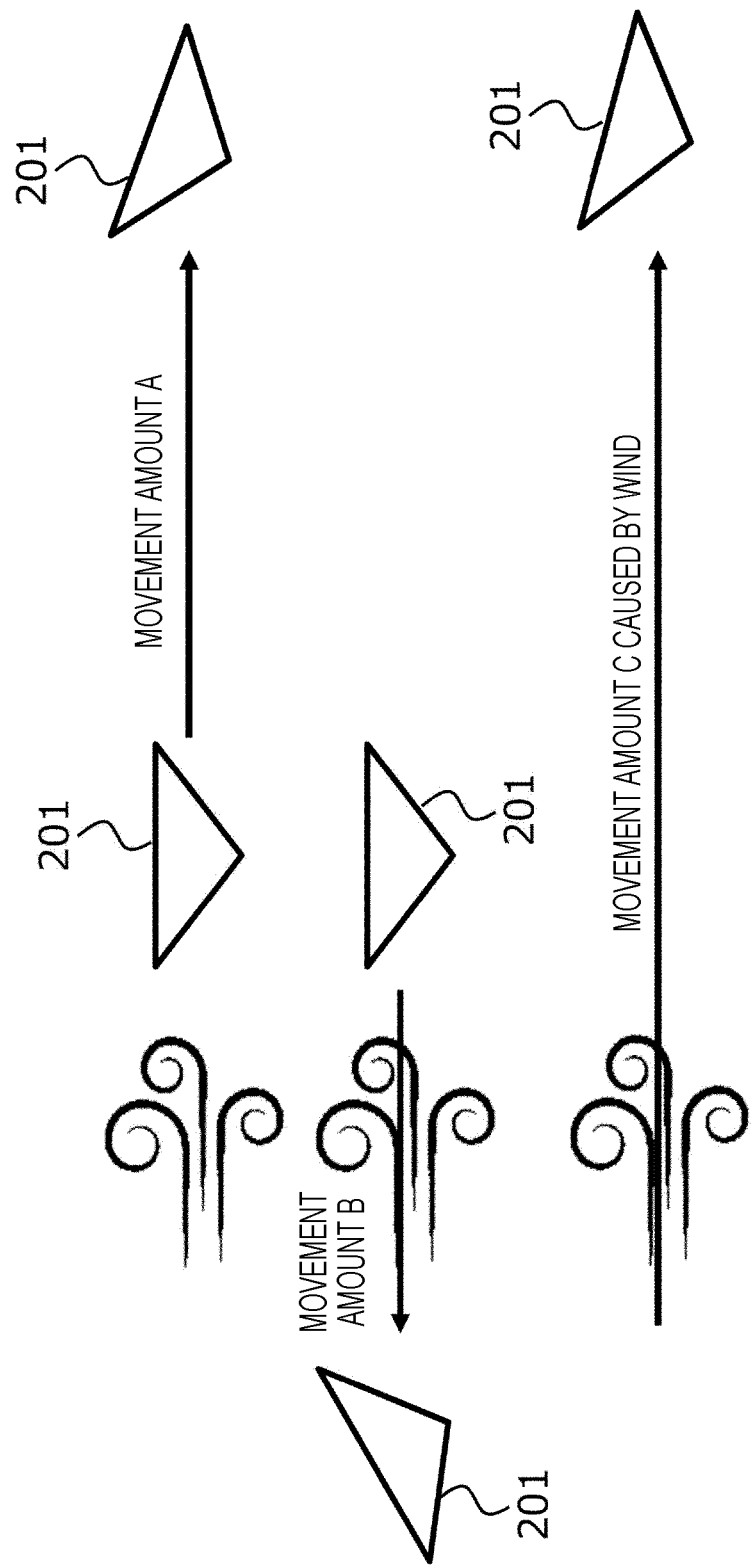
FIG. 8 is a diagram illustrating examples of a movement amount A, a movement amount B, and a movement amount C caused by wind.

FIG. 8 illustrates examples of the movement amount A, the movement amount B, and the movement amount C caused by the wind in a case where the wind-sensing drone 201 moves against the wind. In this case as well, the movement amounts A, B, and C and the wind speed can be calculated similarly to the example of FIG. 5. That is, the speed of wind is calculated by Wind speed (m/s)=C/Movement time.

The communication unit 24 receives the wind information from the wind information calculation unit 32 and transmits the wind information to the target drone 202. Specifically, the communication unit 24 transmits the wind information by a packet according to a communication method to be used. Note that the speed of wind and the direction of wind may be transmitted by the same packet, or may be transmitted by separate packets. Note that the packet represents a transmission unit of information, and may be replaced as a frame, a segment, a datagram, or the like. The communication unit 24 can confirm the mutual positions by communicating with another drone. Positions detected by a GPS reception unit 57 are only required to be used as mutual positions to be exchanged. However, the position stored in the storage unit 30 may be used.

The wind-sensing drone 201 may include elements other than those illustrated in FIG. 4. For example, the wind-sensing drone 201 may include a battery that stores electric power energy for operating each element in the wind-sensing drone 201. The battery may be a primary battery that can only be discharged or a secondary battery that can be charged and discharged. Furthermore, a necessary device (an arm, a basket, an aerial photographing camera, a digestive organ, or the like.) may be provided according to the work performed by the wind-sensing drone 201.

Figure 9:
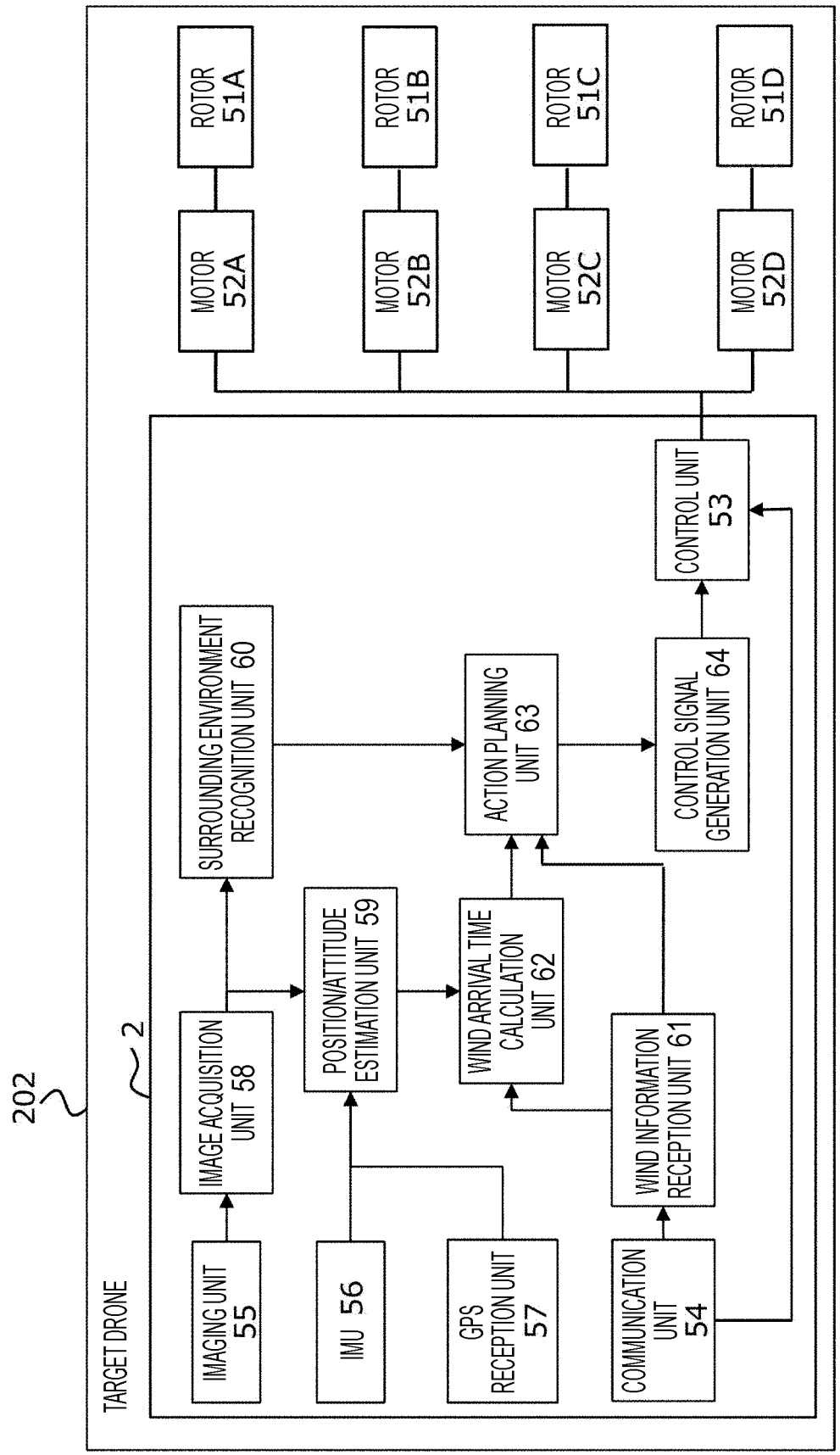
FIG. 9 is a block diagram of an example of a target drone.

FIG. 9 is a block diagram of an example of the target drone 202. The target drone 202 includes a plurality of rotors 51A to 51D, a plurality of motors 52A to 52D, and an information processing apparatus 2. The information processing apparatus 2 includes a control unit 53, a communication unit 54, an imaging unit 55, an inertial measurement unit (IMU) 56, a GPS reception unit 57, an image acquisition unit 58, a position/attitude estimation unit 59, a surrounding environment recognition unit 60, a wind information reception unit 61, a wind arrival time calculation unit 62, an action planning unit 63, a control signal generation unit 64, and a control unit 53.

The rotors 51A to 51D, the motors 52A to 52D, the communication unit 54, the imaging unit 55, the IMU 56, the GPS reception unit 57, the image acquisition unit 58, and the position/attitude estimation unit 59 are similar to the rotors 21A to 21D, the motors 22A to 22D, the communication unit 24, the imaging unit 25, the IMU 26, the GPS reception unit 27, the image acquisition unit 28, and the position/attitude estimation unit 29 in the wind-sensing drone 201 illustrated in FIG. 4, and thus, description thereof will be omitted.

The wind information reception unit 61 receives wind information transmitted from the wind-sensing drone 201 via the communication unit 54. The wind information reception unit 61 provides the received wind information to the wind arrival time calculation unit 62 and the action planning unit 63.

The wind arrival time calculation unit 62 calculates a time (arrival time) until the wind arrives at the target drone 202 on the basis of the wind information from the wind information reception unit 61 and the position (current position) of the target drone 202 estimated by the position/attitude estimation unit 59. The wind arrival time can be calculated by dividing a distance from the target drone 202 to the wind-sensing drone 201 by a wind speed. The distance to the wind-sensing drone 201 can be calculated from a difference between the position of the wind-sensing drone 201 and the position of the target drone 202. As the position of the wind-sensing drone 201, the position estimated by the position/attitude estimation unit 59 of the wind-sensing drone 201 or the position detected by the GPS reception unit 27 is only required to be used. The position of the wind-sensing drone 201 may be included in the wind information and transmitted to the target drone 202, or may be acquired by communication via the communication unit 54 separately from the wind information. The wind arrival time calculation unit 62 provides information regarding the calculated wind arrival time to the action planning unit 63.

The surrounding environment recognition unit 60 acquires an image acquired by the image acquisition unit 58 and recognizes the surrounding environment of the target drone 202. For example, the presence or absence of an obstacle around the target drone 202 is determined, and in a case where the obstacle is present, the obstacle is identified, and the position, size, and the like of the identified obstacle are specified. The surrounding environment recognition unit 60 provides surrounding environment information to the action planning unit 63.

The action planning unit 63 determines an action or operation to be performed by the target drone 202 on the basis of the surrounding environment information, the information regarding the wind arrival time, and the wind information.

For example, the action planning unit 63 performs control to suppress a position fluctuation caused by the wind in accordance with the wind arrival time. For example, in a case where the wind with a wind speed Y [m/s] arrives from a specific direction after X seconds, control is performed to suppress the position fluctuation by generating acceleration against the wind in a direction opposite to the wind after X seconds. For example, a time length during which the wind is blowing may be the same time length as the movement time of the above-described wind-sensing drone 201. For example, in a case where a control command is issued for each sample time and the operation of the wind-sensing drone is performed for each control command, the movement time corresponds to one sample time. In a case where the operation of the wind-sensing drone is performed for a plurality of control commands, a value obtained by multiplying the number of control commands by the sample time corresponds to the movement time. The value of the movement time may be included in the wind information transmitted by the wind-sensing drone 201.

Figure 10:
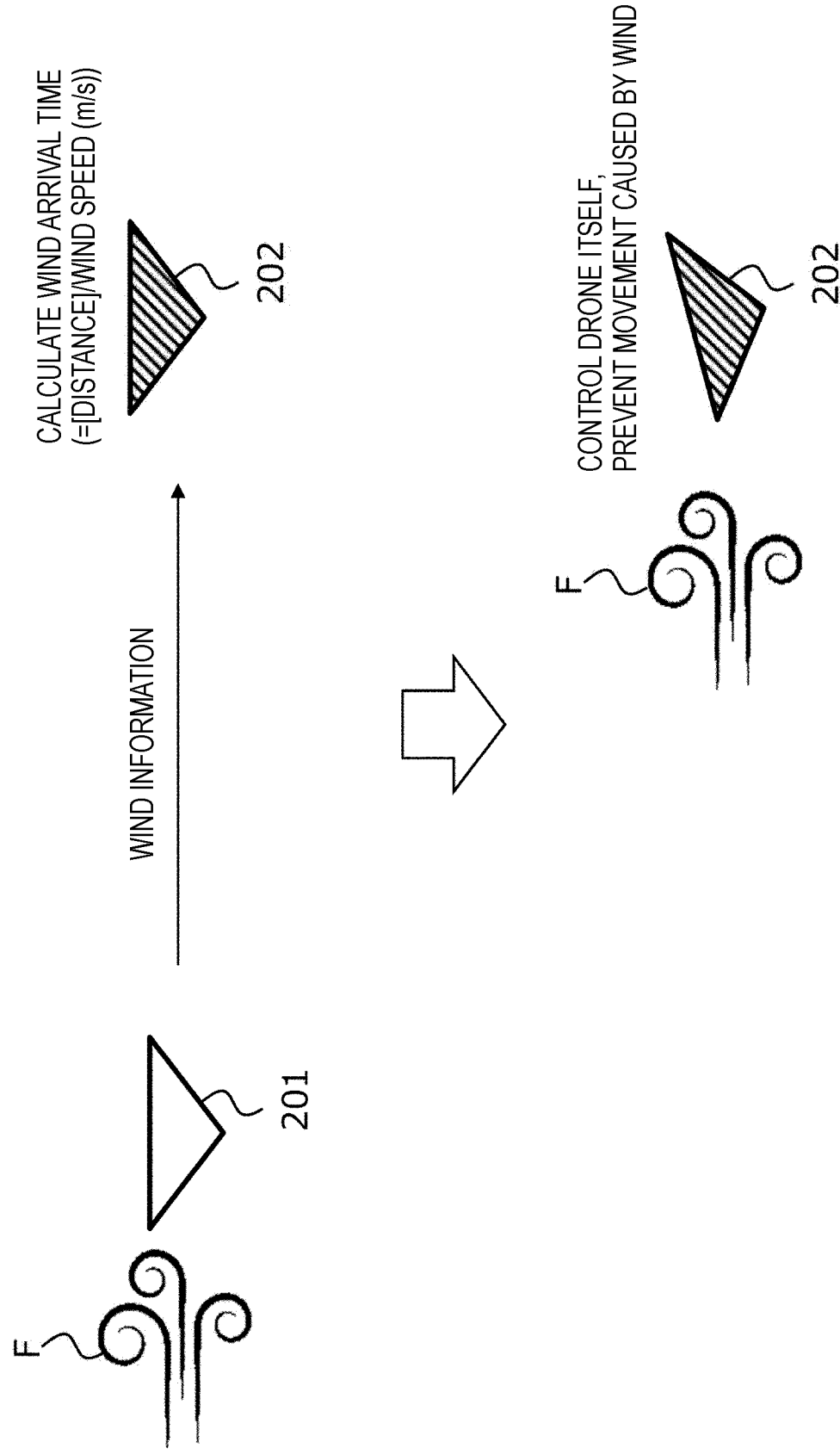
FIG. 10 is a diagram illustrating an example in which a target drone performs control to suppress a position fluctuation.

FIG. 10 illustrates an example in which the target drone 202 performs control to suppress a position fluctuation. As illustrated on the upper side of FIG. 10, the target drone 202 that has received the wind information from the wind-sensing drone 201 calculates the wind arrival time from the distance to the wind-sensing drone 201 and the wind speed. As illustrated in the lower side of FIG. 10, the target drone 202 controls the target drone 202 itself in accordance with the wind arrival time to prevent movement caused by the wind.

Furthermore, in a case where there is an obstacle (for example, a wall, another drone, or the like) around the target drone 202, the action planning unit 63 may determine an action to avoid the obstacle so as not to collide with the obstacle. The avoidance from the obstacle may be performed in a case where the wind speed exceeds an upper limit value, that is, in a case where the wind is strong. In this case, regardless of the control of the target drone 202, the action planning unit 63 determines that the target drone 202 is carried away by the wind and determines to perform the avoidance action. The avoidance from the obstacle is performed, for example, in a case where the obstacle is within the avoidance distance from the target drone 202. The avoidance distance may be a predetermined distance or a distance corresponding to the wind speed (for example, a larger distance as the wind speed is higher).

FIG. 11 illustrates a specific example of avoiding the obstacle. A wall 270 is present as an obstacle in the vicinity of the target drone 202 in a downstream direction of wind. The target drone 202 moves to a place not overlapping the wall in the wind direction. In the example of the drawing, the target drone 202 climbs sharply. Therefore, even when the target drone 202 is carried away by the wind, it is possible to prevent the target drone 202 from colliding with the wall. The target drone 202 may additionally perform control to suppress the position fluctuation after the sharp climbing.

Figure 12:
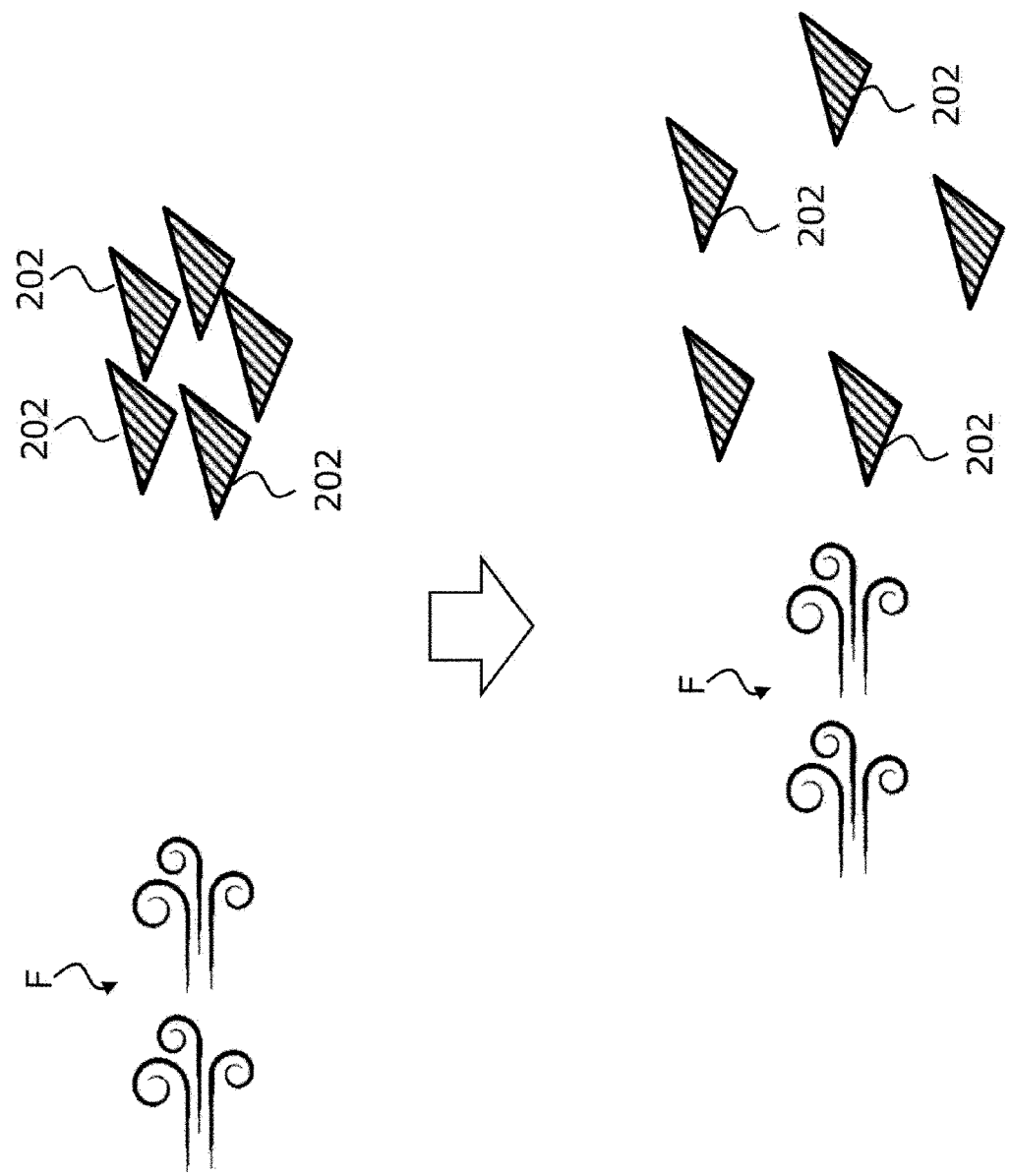
FIG. 12 is a diagram illustrating another specific example of avoiding an obstacle.

FIG. 12 illustrates another specific example of avoiding the obstacle. A plurality of target drones 202 is densely present. A plurality of the target drones 202 cooperates so as to increase the distance to each other and is dispersed. Even when a plurality of the target drones 202 is carried away by the wind, it is possible to prevent the target drone 202 from colliding with each other. A plurality of the target drones 202 may additionally perform control to suppress the position fluctuation after being dispersed.

The target drone 202 may include elements other than those illustrated in the drawing. For example, the target drone 202 may include a battery that stores electric power energy for operating each element in the target drone 202. The battery may be a primary battery that can only be discharged or a secondary battery that can be charged and discharged. Furthermore, a necessary device (an arm, a basket, an aerial photographing camera, a digestive organ, or the like) may be provided according to the work performed by target drone 202.

Hereinafter, a specific example of the operation of the embodiment will be described with reference to FIG. 13 and FIG. 14.

Figure 13:
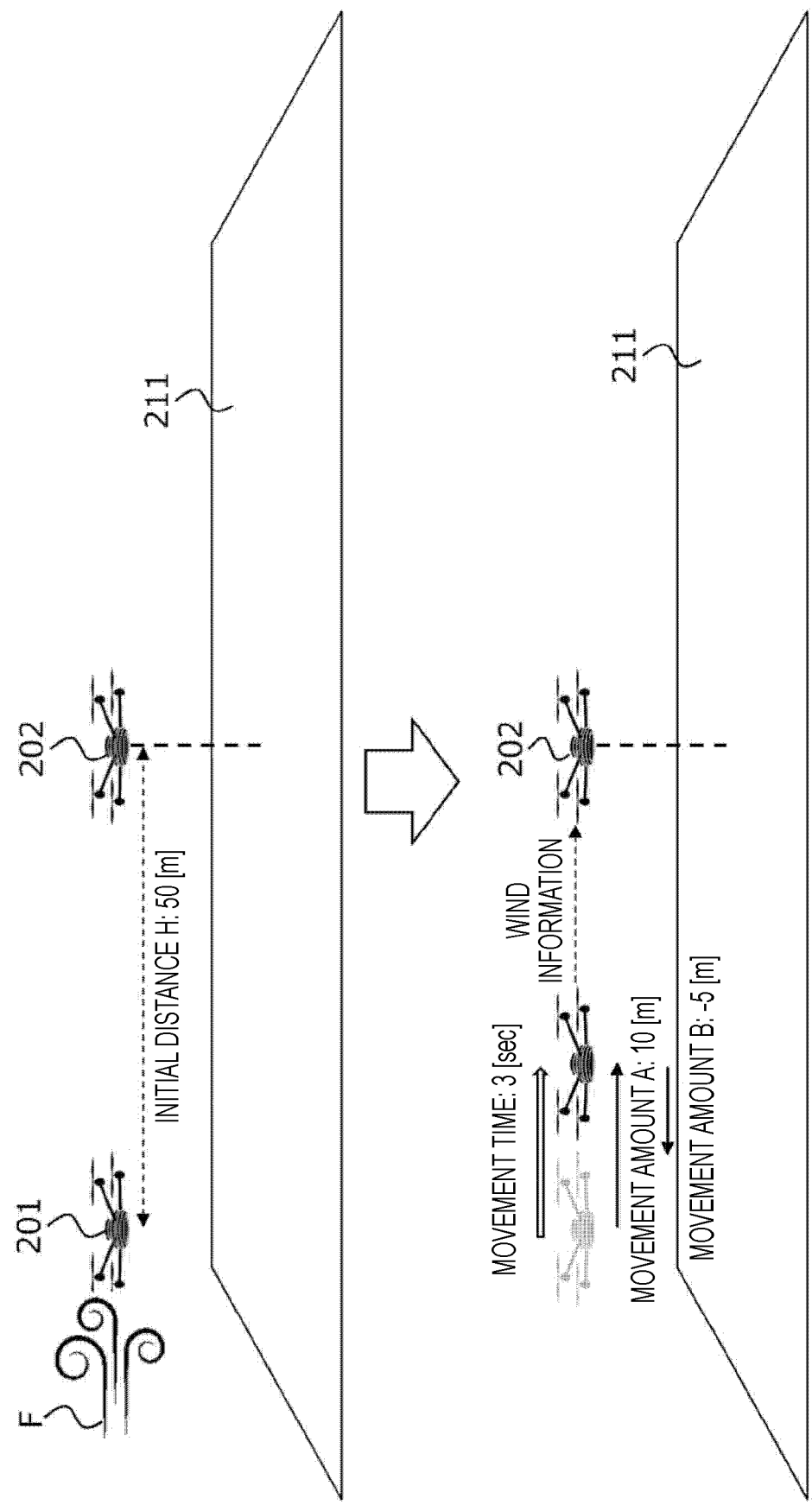
FIG. 13 is a diagram illustrating a specific example of operation of the embodiment.

FIG. 13 illustrates a specific example of the operation of the embodiment.

As illustrated on the upper side of FIG. 13, the wind-sensing drone 201 and the target drone 202 are at the same height above the ground surface 211. The target drone 202 is performing work while hovering. The wind-sensing drone 201 is positioned at a place separated from the target drone 202 by an initial distance H of 50 [m]. In this situation, the wind F is blown from the opposite direction at the same time when the wind-sensing drone 201 starts the operation of moving in a left direction in response to the control command, and the wind-sensing drone 201 is carried away by 10 [m] in the direction of the wind F for three seconds as illustrated in the lower side of FIG. 13. It is assumed that the control command gives an instruction to advance at a speed of 5/3 [m/s] for three seconds.

In this case, the movement amount B calculated by the second movement vector calculation unit 33 is 5/3×3=5 [m] (In the drawing, a rightward direction is positive, and thus it is indicated as −5 [m]). Furthermore, the movement amount A calculated by the first movement vector calculation unit 31 is 10 [m]. Therefore, the movement amount C caused by the wind is 5+10=15 [m]. Therefore, Wind speed=Movement amount C/Movement time=15/3=5 [m/s].

Figure 14:
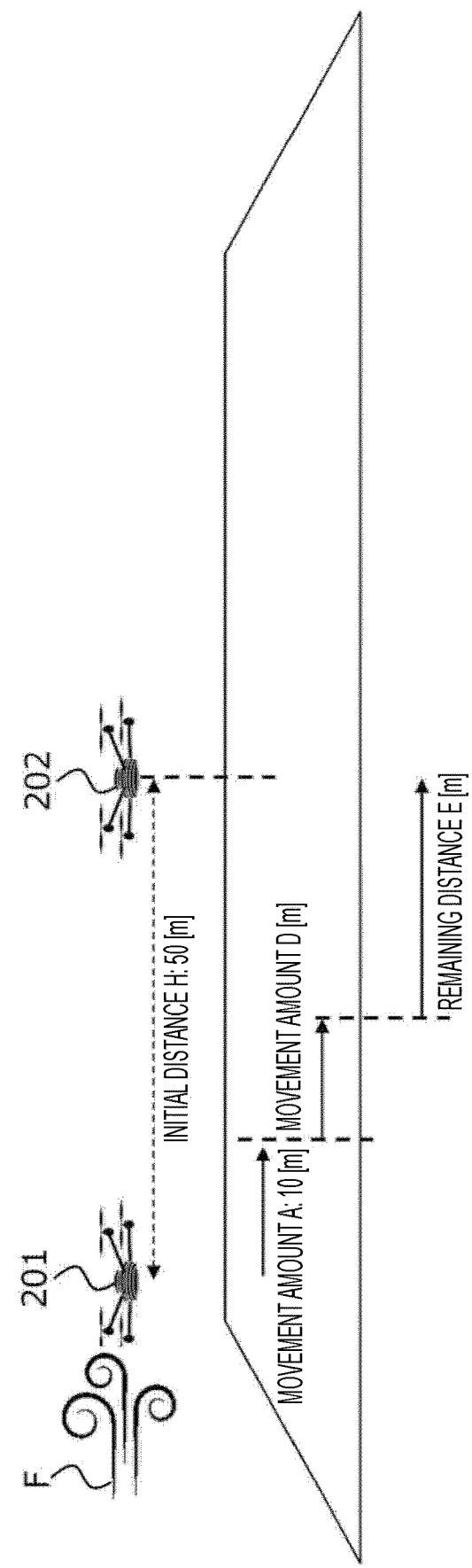
FIG. 14 is a diagram illustrating an operation example subsequent to FIG. 13.

FIG. 14 illustrates an operation example subsequent to FIG. 13. The wind-sensing drone 201 calculates a distance (movement amount D) carried away while calculating the wind speed. Assuming that the processing time required to calculate the movement amount D is 0.4 [s], Movement amount D=Wind speed×Processing time=5 [m/s]×0.4 [s]= 2 [m].

At this point, a distance (referred to as a remaining distance E) from the wind-sensing drone 201 to the target drone 202 is calculated by subtracting the movement amount A and the movement amount D from the initial distance H. Therefore, Remaining distance E=Initial distance H−Movement amount A−Movement amount D=50−10−2=38 [m].

Therefore, the arrival time required for the wind F to arrives at the target drone is calculated as below.

Arrival time=Remaining distance E/wind speed=38/ 5=7.6 [s]

By appropriately performing control for the wind of 5 [m/s] arriving 7.6 seconds after receiving the wind information, the target drone 202 can prevent the position fluctuation caused by the wind and continue the stable work. In the above description, the distance (movement amount D) carried away while the wind speed is calculated is taken into consideration, but in a case where the time required to calculate the wind speed is sufficiently short, the time for calculating the wind speed may not be taken into consideration. Furthermore, the time required to calculate the wind speed may be given to the target drone 202 in advance.

Figure 15:
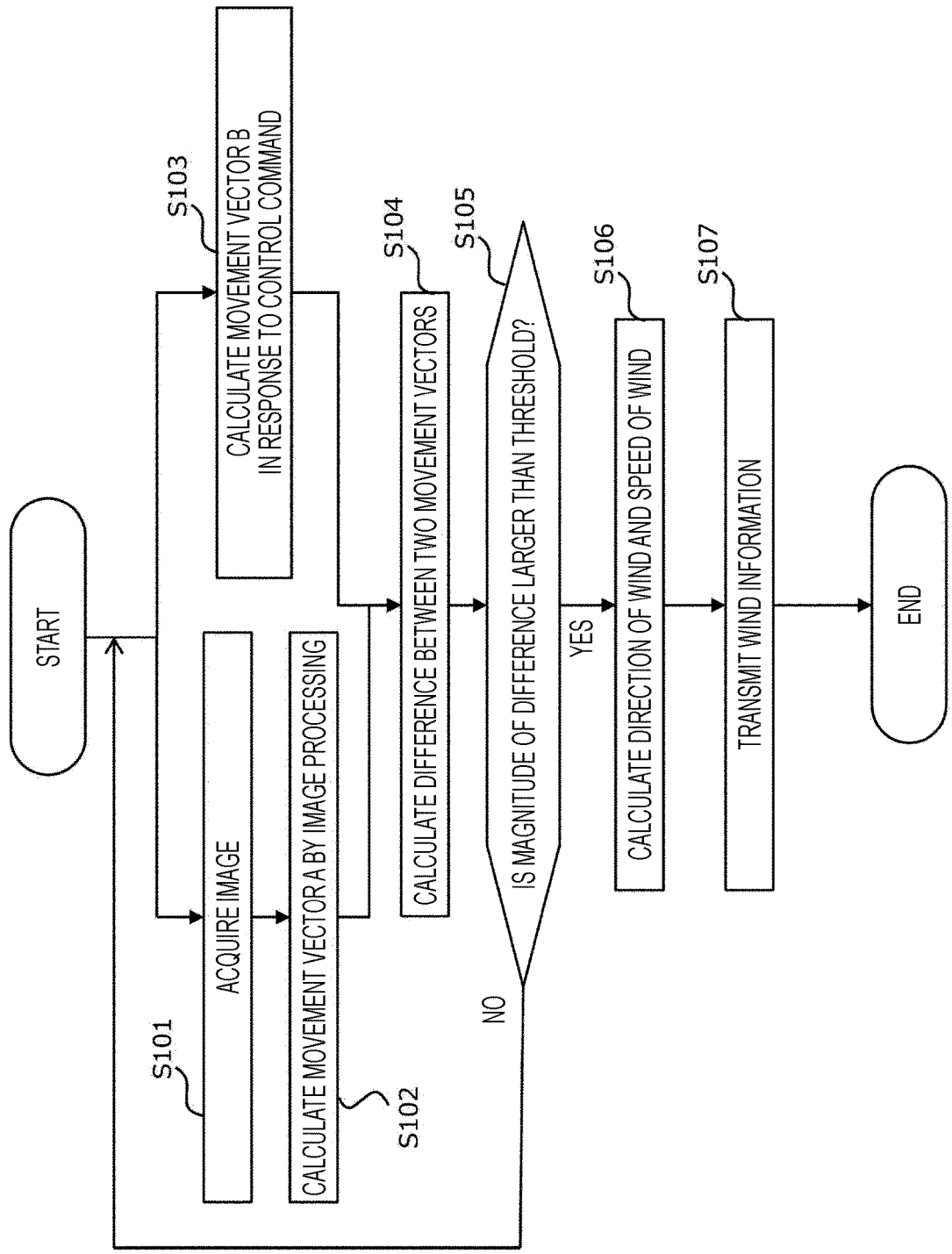
FIG. 15 is a flowchart illustrating an example of operation of a wind-sensing drone.

FIG. 15 is a flowchart illustrating an example of the operation of the wind-sensing drone 201. The image acquisition unit 28 acquires an image from the imaging unit 25 (S101). On the basis of the acquired image and the inertial data detected by the IMU 26, the position/attitude estimation unit 29 estimates the position and attitude of the wind-sensing drone by performing image processing using SLAM (S102). Note that in order to estimate at least one of the position or the attitude, a method of performing estimation only from the image is also possible without using the inertial data. The first movement vector calculation unit 31 calculates the movement vector A on the basis of the difference between the estimated position and the position before the movement (position before movement time) (S102 in the same flowchart). Note that information regarding the estimated attitude is provided in notification to the control unit 23, and can be used for attitude control for the wind-sensing drone 201. On the other hand, the control unit 23 executes the control command to control the movement of the wind-sensing drone 201, and the second movement vector calculation unit 33 calculates the movement vector B on the basis of the position after the movement calculated in response to the control command (S103). The wind information calculation unit 32 calculates the wind vector W on the basis of the difference between the movement vector A and the movement vector B (S104). The wind sensing unit 32A of the wind information calculation unit 32 determines whether or not the magnitude of the wind vector W is larger than a threshold (S105), and determines that there is no wind or there is little wind in a case where the magnitude of the wind vector W is equal to or smaller than the threshold (NO in S105), and the processing returns to the initial processing. On the other hand, in a case where the magnitude of the wind vector W is larger than the threshold (YES in S105), the wind information calculation unit 32 calculates the speed of wind from a length of the wind vector and the above-described movement time, and calculates the direction of wind from the direction of the wind vector (S106). The wind information calculation unit 32 generates wind information including the speed of wind and the direction of wind, and transmits the generated wind information to the target drone 202 via the communication unit 24. As an example, the target drone 202 is a drone that is present on the downstream side with respect to the wind-sensing drone 201 in the wind direction.

Figure 16:
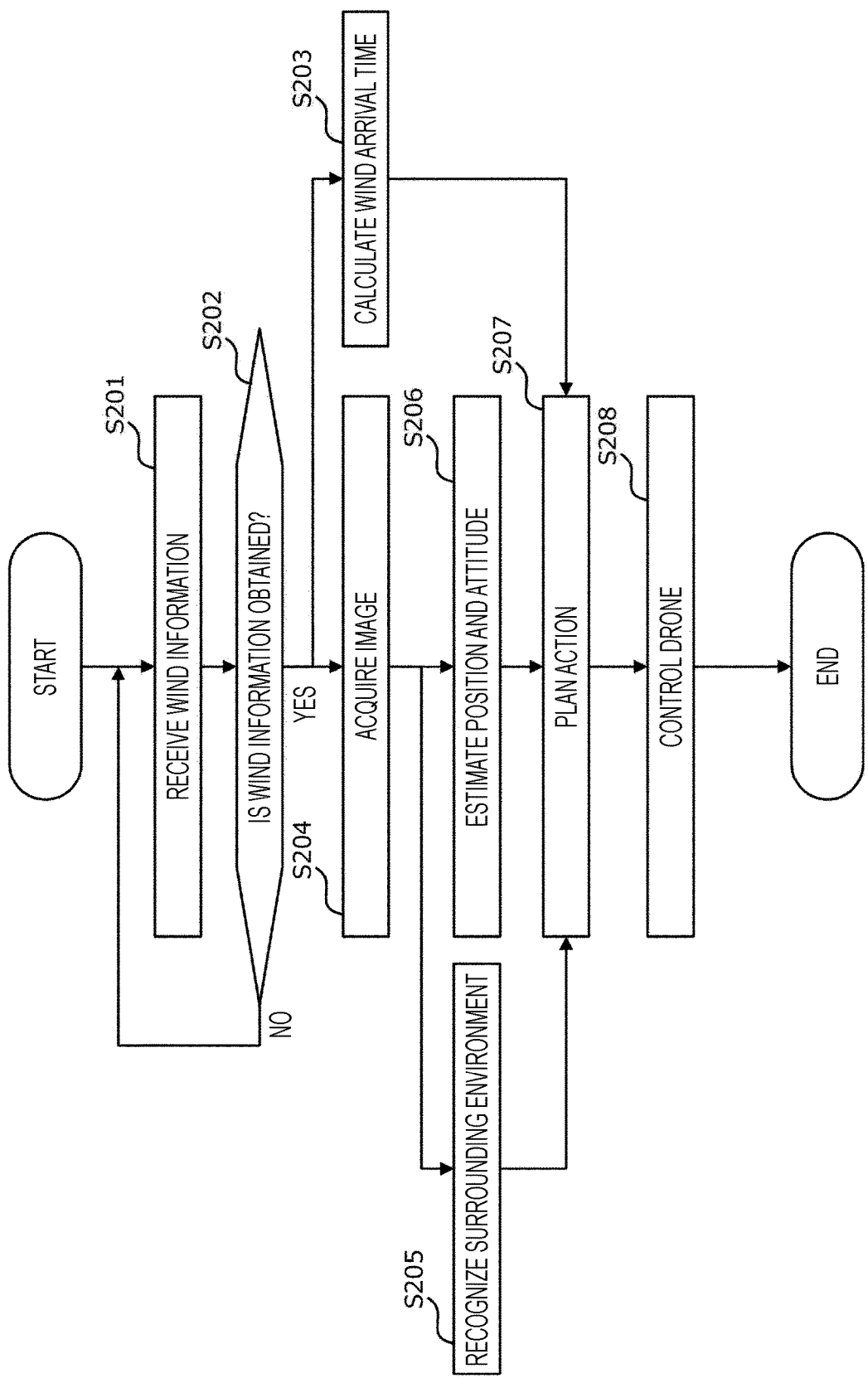
FIG. 16 is a flowchart illustrating an example of operation of a target drone.

FIG. 16 is a flowchart illustrating an example of the operation of the target drone 202. The wind information reception unit 61 waits for reception of the wind information from the wind-sensing drone 201 via the communication unit 54 (S201 and NO in S202). When the wind information is received (YES in S202), the wind arrival time calculation unit 62 calculates the wind arrival time on the basis of the wind information (S203). Furthermore, the image acquisition unit 58 acquires an image from the imaging unit 55 (S204), and the surrounding environment recognition unit 60 performs recognition processing of the image of the surrounding environment (S205). On the basis of the acquired image and the inertial data detected by the IMU 56, the position/attitude estimation unit 59 estimates the position and attitude of the target drone 202 by performing image processing using the SLAM (S206). The action planning unit 63 determines an action to be performed by the target drone 202 on the basis of the wind information, the wind arrival time, and at least a position of the estimated position and attitude (S207). The control signal generation unit 64 generates a control signal (control command) giving an instruction on execution of the determined action, and the control unit 53 controls the drone on the basis of the control signal (S208).

As described above, according to the present embodiment, a position (first position) of the wind-sensing drone 201 is estimated on the basis of the image captured by the imaging unit 25, a position (second position) of the wind-sensing drone 201 is calculated on the basis of the control command, the speed and direction of wind are acquired on the basis of the difference between the first position and the second position, and thus the speed and direction of wind can be detected with high accuracy. In a case where the position is estimated using the GPS, there is a possibility that gentle wind cannot be detected due to an error of the GPS. However, the first position is estimated by using the image, and thus the movement caused by the gentle wind can be reliably detected. Note that even when the GPS is used to calculate a distance between the wind-sensing drone 201 and the target drone 202, there is no influence on the detection of the wind and the distance between the drones is sufficiently larger than the error of the GPS. Therefore, there is no problem.

First Modification Example

In the embodiment described above, the wind information includes the speed and direction of wind, but it is also possible not to include the direction of wind. In this case, when receiving the wind information, the target drone 202 may specify a direction in which the wind-sensing drone 201 is present, and may regard the direction in which the wind-sensing drone 201 is present as a wind direction.

Second Modification Example

A part of processing performed by the target drone 202 may be performed by the wind-sensing drone 201. For example, the wind-sensing drone 201 may calculate an arrival time required for the wind to arrive at the target drone 202, and the calculated arrival time may be included in the wind information to be transmitted to the target drone 202.

Figure 17:
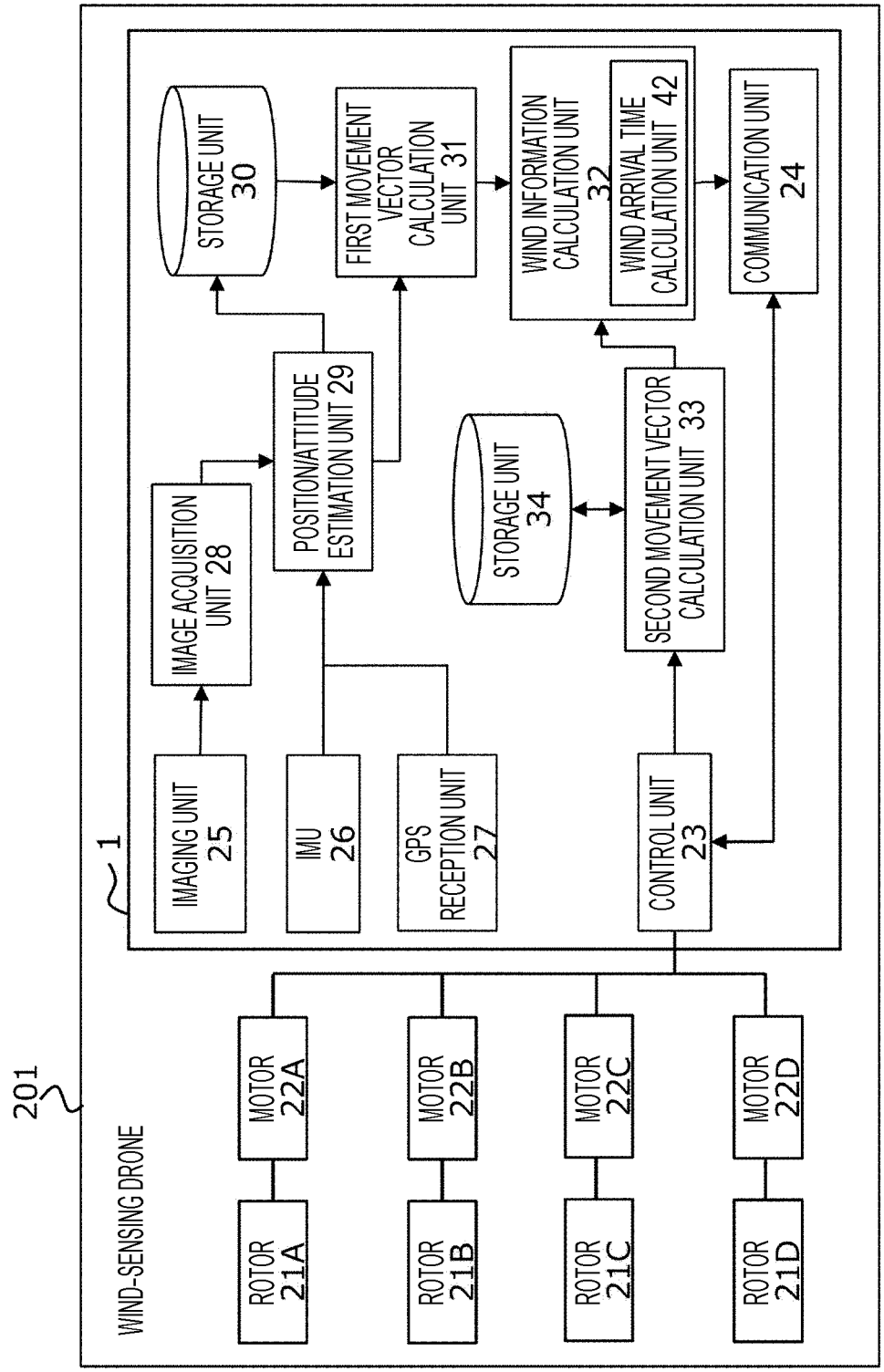
FIG. 17 is a block diagram of a wind-sensing drone according to a second modification example.

FIG. 17 is a block diagram of the wind-sensing drone 201 according to the second modification example. The wind information calculation unit 32 includes a wind arrival time calculation unit 42. The wind arrival time calculation unit 42 calculates the arrival time similarly to the wind arrival time calculation unit 62 of the target drone 202. The communication unit transmits information regarding the arrival time to the target drone 202. The information regarding the arrival time may be included in the wind information and transmitted.

The wind information may be used to determine a timing to transmit the wind information without transmitting the information regarding the arrival time. For example, the wind information calculation unit 32 transmits the wind information via the communication unit 24 at a timing when the wind arrives at the target drone 202 a certain period of time after the target drone 202 receives the wind information. Such a timing can be determined on the basis of the calculated arrival time. The target drone 202 determines that the wind will arrive a certain period of time after the reception of the wind information and controls the target drone 202 itself.

Third Modification Example

The control unit 23 of the wind-sensing drone 201 may control the movement of the wind-sensing drone 201 itself on the basis of the wind information. That is, the control unit 23 may perform control to suppress or prevent the position of the wind-sensing drone 201 from moving due to the wind. Furthermore, the second movement vector calculation unit 33 (calculation unit) of the wind-sensing drone 201 may calculate the attitude of the wind-sensing drone 201 in response to the control command, and calculate the fluctuation amount of the attitude, which is caused by the wind, on the basis of a difference between the calculated attitude and the attitude estimated by the position/attitude estimation unit 29. The control unit 23 may control the attitude of the wind-sensing drone 201 so as to cope with the calculated fluctuation amount.

Fourth Modification Example

The wind-sensing drone 201 may transmit the wind information to the base station 151 capable of communicating with the target drone 202. In this case, the base station 151 transmits (transfers) the wind information received from the wind-sensing drone 201 to the target drone 202. In this case, the target drone 202 may calculate the wind arrival time in consideration of the time required to transfer the wind information. As described above, the other communication device to which the wind information is to be transmitted may be either the base station 151 or the target drone 202.

Hardware Configuration

Figure 18:
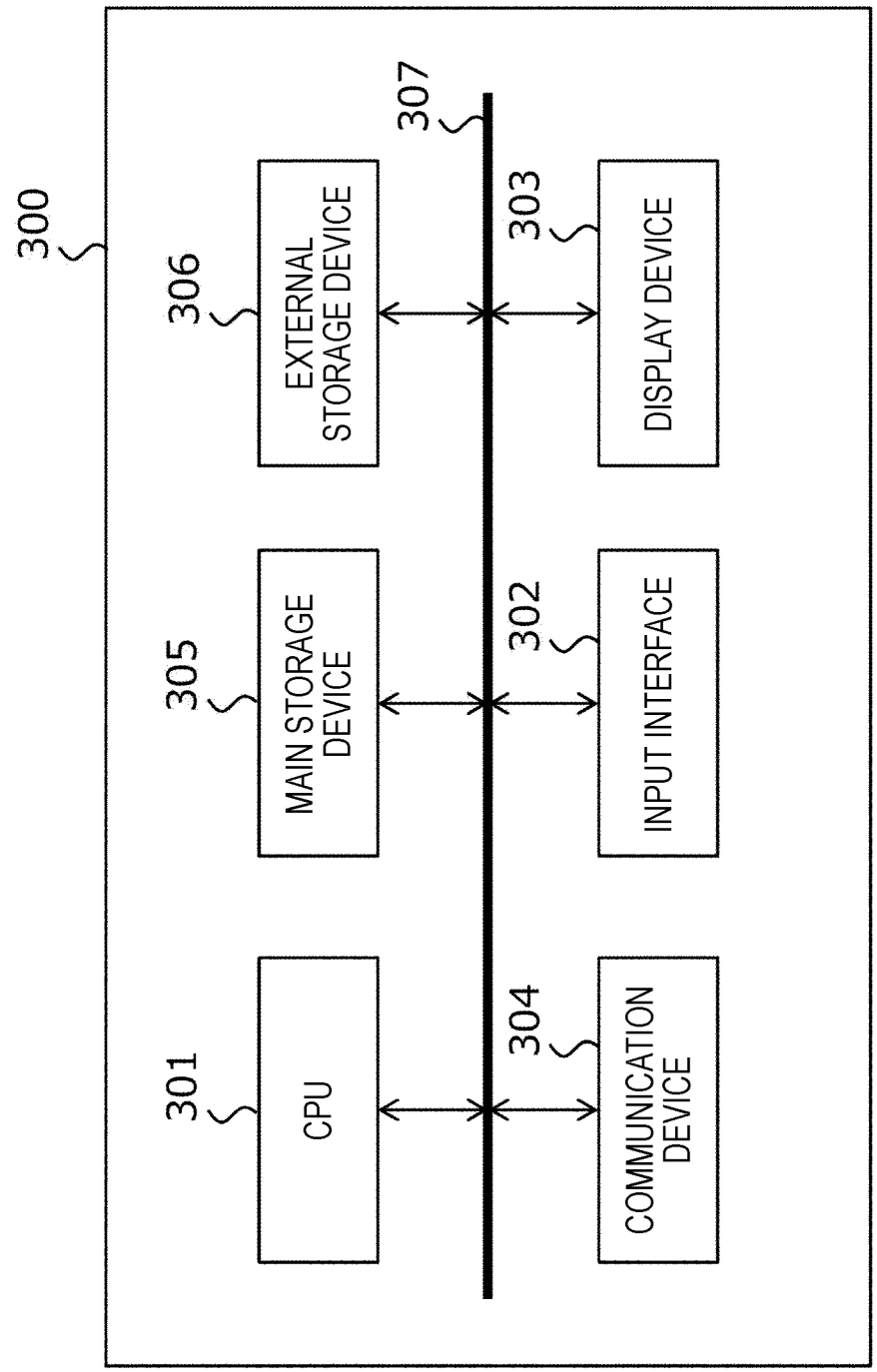
FIG. 18 is a diagram illustrating an example of a hardware configuration of an information processing apparatus.

FIG. 18 illustrates an example of a hardware configuration of the information processing apparatus 1 of the wind-sensing drone 201 or the information processing apparatus 2 of the target drone 202. The information processing apparatus 1 or 2 is configured by a computer apparatus 300. The computer apparatus 300 includes a CPU 301, an input interface 302, a display device 303, a communication device 304, a main storage device 305, and an external storage device 306, which are connected to each other via a bus 307. At least one of these elements may not be included in the information processing apparatus 1 or 2.

The central processing unit (CPU) 301 executes a computer program on the main storage device 305. The computer program is a program that implements each of the above-described functional configurations of the information processing apparatus. The computer program may be achieved not by one program but by a combination of a plurality of programs and scripts. The CPU 301 executes the computer program to implement each functional configuration.

The input interface 302 is a circuit for inputting an operation signal from an input device such as a keyboard, a mouse, or a touch panel to the information processing apparatus 1 or 2.

The display device 303 displays data stored in the information processing apparatus 1 or 2 or data calculated by the information processing apparatus 1 or 2. The display device 303 is, for example, a liquid crystal display (LCD), an organic electroluminescence display, a cathode ray tube (CRT), or a plasma display (PDP), but is not limited thereto.

The communication device 304 is a circuit for the information processing apparatus 1 or 2 to communicate with an external device by wire or wirelessly. Data used in the information processing apparatus 1 or 2 can be input from the external device via the communication device 304. The communications device 304 includes an antenna. Data input from the external device can be stored in the main storage device 305 or the external storage device 306. The communication unit in FIG. 4 or FIG. 9 may be configured in the communication device 304.

The main storage device 305 stores a computer program, data necessary for executing the computer program, data generated by executing the computer program, and the like. The computer program is deployed and executed on the main storage device 305. The main storage device 305 is, for example, RAM, DRAM, or SRAM, but is not limited thereto. Each storage unit in FIG. 4 or FIG. 9 may be configured in the main storage device 305.

The external storage device 306 stores a computer program, data necessary for executing the computer program, data generated by executing the computer program, and the like. These computer programs and data are read into the main storage device 305 when the computer program is executed. Examples of the external storage device 306 include a hard disk, an optical disk, a flash memory, and a magnetic tape, but are not limited thereto. Each storage unit in FIG. 4 or FIG. 9 may be configured in the main storage device 305.

Note that the computer program may be installed in the computer apparatus 300 in advance or may be stored in a storage medium such as a CD-ROM or the like. Furthermore, the computer program may be uploaded on the Internet.

Furthermore, the computer apparatus 300 may be configured as a single apparatus, or may be configured as a system including a plurality of computer apparatuses connected to each other.

Note that the above-described embodiment illustrates examples for embodying the present disclosure, and the present disclosure can be implemented in various other forms. For example, various modifications, substitutions, omissions, or combinations thereof can be made without departing from the gist of the present disclosure. Such modifications, substitutions, omissions, and the like are also included in the scope of the present disclosure and are similarly included in the invention described in the claims and the equivalent scopes thereof.

Furthermore, the effects of the present disclosure described in the present description are merely exemplification, and other effects may be provided.

Note that the present disclosure can have the following configurations.

[Item 1]
A mobile body including:
an imaging unit configured to capture an image of an environment around the mobile body;
an estimation unit configured to estimate a position of the mobile body on the basis of the image captured by the imaging unit;
a calculation unit configured to calculate the position of the mobile body on the basis of a control command for controlling movement of the mobile body; and
a wind information calculation unit configured to calculate information regarding wind acting on the mobile body on the basis of a first position that is the position of the mobile body, which is estimated by the estimation unit, and a second position that is the position of the mobile body, which is calculated by the calculation unit.

[Item 2]
The mobile body according to Item 1, further including an inertial sensor configured to detect inertial data including at least one of acceleration or angular velocity of the mobile body,
in which the estimation unit estimates the position of the mobile body on the basis of the image and the inertia data.

[Item 3]
The mobile body according to Item 1 or 2, in which the wind information calculation unit calculates a speed of the wind on the basis of a distance between the second position and the first position and a movement time required for the mobile body to move in response to the control command.

[Item 4]
The mobile body according to any one of Items 1 to 3, in which the wind information calculation unit sets a direction from the second position to the first position as a direction of the wind.

[Item 5]
The mobile body according to any one of Items 1 to 4, further including a communication unit configured to transmit information regarding the wind to another communication device different from the mobile body.

[Item 6]
The mobile body according to Item 5, in which the another communication device is another mobile body present on a downstream side with respect to the mobile body in a direction of the wind.

[Item 7]
The mobile body according to Item 5 or 6, in which the another communication device is a base station which is capable of communicating with another mobile body present on a downstream side with respect to the mobile body in a direction of the wind.

[Item 8]
The mobile body according to any one of Items 1 to 7, further including a control unit configured to perform control to prevent a position of the mobile body from fluctuating on the basis of information regarding the wind.

[Item 9]
The mobile body according to Item 2,
in which the estimation unit further estimates an attitude of the mobile body, and
the calculation unit calculates the attitude of the mobile body on the basis of the control command,
the mobile body further including a control unit configured to control the attitude of the mobile body on the basis of a difference between the estimated attitude and the calculated attitude.

[Item 10]

The mobile body according to Item 6 or 7, further including an arrival time calculation unit configured to calculate an arrival time required for the wind to arrive at the another mobile body on the basis of information regarding the wind and a distance to the another mobile body, in which the communication unit transmits information regarding the arrival time to the another mobile body.

[Item 11]

The mobile body according to any one of Items 1 to 10, in which the mobile body is a drone.

[Item 12]

An information processing method including:
capturing an image of an environment around a mobile body;
estimating a position of the mobile body on the basis of the captured image;
calculating the position of the mobile body on the basis of a control command for controlling movement of the mobile body; and
calculating information regarding wind acting on the mobile body on the basis of a first position that is the estimated position of the mobile body and a second position that is the calculated position of the mobile body.

[Item 13]

A computer program for causing a computer to execute:
a step of estimating a position of a mobile body on the basis of an image obtained by imaging an environment around the mobile body;
a step of calculating the position of the mobile body on the basis of a control command for controlling movement of the mobile body; and
a step of calculating information regarding wind acting on the mobile body on the basis of a first position that is the estimated position of the mobile body and a second position that is the calculated position of the mobile body.

REFERENCE SIGNS LIST

1 Information processing apparatus
2 Information processing apparatus
21A Rotor
21B Rotor
21C Rotor
21D Rotor
22A Motor
22B Motor
22C Motor
22D Motor
23 Control unit
24 Communication unit
25 Imaging unit
27 GPS reception unit
28 Image acquisition unit
29 Position/attitude estimation unit (estimation unit)
30 Storage unit
31 First movement vector calculation unit
32 Wind information calculation unit
32A Wind sensing unit
33 Second movement vector calculation unit (calculation unit)
34 Storage unit
42 Wind arrival time calculation unit
51A Rotor
51B Rotor
51C Rotor
51D Rotor
52A Motor
52B Motor
52C Motor
52D Motor
53 Control unit
54 Communication unit
55 Imaging unit
57 GPS reception unit
58 Image acquisition unit
59 Position/attitude estimation unit
60 Surrounding environment recognition unit
61 Wind information reception unit
62 Wind arrival time calculation unit
63 Action planning unit
64 Control signal generation unit
101 Wind-sensing drone
101A Mobile body (drone)
101B Mobile body (drone)
101C Mobile body (drone)
102 Remote controller
102A Remote controller
102B Remote controller
102C Remote controller
151 Base station
201 Wind-sensing drone
201 Drone
201A Drone
201B Drone
201C Drone
202 Target drone
211 Ground surface
270 Wall
300 Computer apparatus
302 Input interface
303 Display device
304 Communication device
305 Main storage device
306 External storage device
307 Bus

The invention claimed is:

1. A first mobile body, comprising:
a camera configured to capture an image of an environment of the first mobile body; and
a central processing unit (CPU) configured to:
determine a first position of the first mobile body based on the captured image;
determine a second position of the first mobile body based on a control command;
control movement of the first mobile body based on the control command;
determine first information associated with wind on the first mobile body based on the first position of the first mobile body and the second position of the first mobile body; and
control, based on the determined first information, a fluctuation at one of the first position of the first mobile body or the second position of the first mobile body.

2. The first mobile body according to claim 1, further comprising an inertial sensor, wherein
the inertial sensor is configured to detect inertial data that includes at least one of acceleration of the first mobile body or angular velocity of the first mobile body, and
the CPU is further configured to determine the first position of the first mobile body based on the captured image and the inertial data.

3. The first mobile body according to claim 2, wherein the CPU is further configured to:
determine a first attitude of the first mobile body based on the image and the inertial data;
determine a second attitude of the first mobile body based on the control command;
determine a difference between the first attitude and the second attitude; and
control at least one of the first attitude or the second attitude based on the determined difference.

4. The first mobile body according to claim 1, wherein
the CPU is further configured to determine a speed of the wind based on a movement time and a distance between the second position and the first position, and
the control command gives an instruction to the CPU at the movement time.

5. The first mobile body according to claim 1, wherein the CPU is further configured to set a direction from the second position to the first position as a direction of the wind.

6. The first mobile body according to claim 1, wherein the CPU is further configured to transmit the first information to a communication device different from the first mobile body.

7. The first mobile body according to claim 6, wherein
the communication device is a second mobile body, and
the second mobile body is on a downstream side of a direction of the wind.

8. The first mobile body according to claim 7, wherein the CPU is further configured to;
determine an arrival time for the wind to arrive at the second mobile body based on the first information and a distance to the second mobile body; and
transmit second information associated with the arrival time to the second mobile body.

9. The first mobile body according to claim 6, wherein
the communication device is a base station, and
the communication device communicates with a second mobile body on a downstream side of a direction of the wind.

10. The first mobile body according to claim 1, wherein the first mobile body is a drone.

11. An information processing method, comprising:
in an information processing apparatus:
capturing an image of an environment of a mobile body;
determining a first position of the mobile body based on the captured image;
determining a second position of the mobile body based on of a control command;
controlling movement of the mobile body based on the control command;
determining information associated with wind on the mobile body based on the first position of the mobile body and the second position of the mobile body; and
controlling, based on the determined information, a fluctuation at one of the first position of the mobile body or the second position of the mobile body.

12. A non-transitory computer-readable medium having stored thereon, computer-executable instructions which, when executed by a computer, cause the computer to execute operations, the operations comprising:
determining a first position of a mobile body based on an image, wherein the image is obtained by imaging an environment around the mobile body;
determining a second position of the mobile body based on a control command;
controlling movement of the mobile body based on the control command;
determining information associated with wind on the mobile body based on the first position of the mobile body and the second position of the mobile body; and
controlling, based on the determined information, a fluctuation at one of the first position of the mobile body or the second position of the mobile body.

* * * * *